United States Patent
Payton et al.

(10) Patent No.: US 12,111,290 B2
(45) Date of Patent: Oct. 8, 2024

(54) METHOD AND SYSTEM OF IDENTIFYING A BOND BOUNDARY BETWEEN A SOUND BOND AND A WEAK BOND IN A MULTILAYER ARTICLE

(71) Applicant: DMC Global Inc., Broomfield, CO (US)

(72) Inventors: Brian Payton, Mt. Braddock, PA (US); Andrew Ruminski, Natrona Heights, PA (US); Curtis Erwin Prothe, Brevard, NC (US); Steven David Sparkowich, Vancouver, WA (US)

(73) Assignee: DMC Global Inc., Broomfield, CO (US)

( * ) Notice: Subject to any disclaimer, the term of this patent is extended or adjusted under 35 U.S.C. 154(b) by 413 days.

(21) Appl. No.: 17/604,241

(22) PCT Filed: Apr. 17, 2020

(86) PCT No.: PCT/US2020/028713
§ 371 (c)(1),
(2) Date: Oct. 15, 2021

(87) PCT Pub. No.: WO2020/214926
PCT Pub. Date: Oct. 22, 2020

(65) Prior Publication Data
US 2022/0196604 A1 Jun. 23, 2022

Related U.S. Application Data

(60) Provisional application No. 62/834,987, filed on Apr. 17, 2019.

(51) Int. Cl.
*G01N 29/06* (2006.01)
*B23K 20/08* (2006.01)
(Continued)

(52) U.S. Cl.
CPC ........... *G01N 29/069* (2013.01); *B23K 20/08* (2013.01); *B23K 31/125* (2013.01); *G01N 29/07* (2013.01)

(58) Field of Classification Search
CPC ................ G01N 29/069; G01N 29/07; G01N 2291/0231; G01N 2291/267;
(Continued)

(56) References Cited

U.S. PATENT DOCUMENTS 4,168,629 A 9/1979 Bulteel
4,570,487 A 2/1986 Gruber
(Continued)

FOREIGN PATENT DOCUMENTS

CN 101467893 A 7/2009
CN 101846655 A 9/2010
(Continued)

OTHER PUBLICATIONS

WO-2019201925-A1_translated (Year: 2019).*
(Continued)

*Primary Examiner* — Manish S Shah
*Assistant Examiner* — Michael J Singletary
(74) *Attorney, Agent, or Firm* — Womble Bond Dickinson (US) LLP

(57) ABSTRACT

A method of identifying a bond boundary between a sound bond and weak bond in a multilayer article may include determining a plurality of positions on a surface of the article; for each position of the plurality of positions, obtaining a full-wave, time domain waveform of ultrasonic waves reflected from the article; and, for each pair of adjacent positions among the plurality of positions, determining whether there is a bond boundary between a first position and a second position based on a comparison of a waveform characteristic of a first waveform generated at the first
(Continued)

position and the waveform characteristic of a second waveform generated at the second position; and in response to a determination that there is a bond boundary between the first position and the second position, determining a boundary position based on the first position and the second position and memorializing the boundary position.

15 Claims, 22 Drawing Sheets

(51) Int. Cl.
*B23K 31/12* (2006.01)
*G01N 29/07* (2006.01)

(58) Field of Classification Search
CPC ............ G01N 29/048; G01N 29/265; G01N 2291/0289; G01N 2291/044; G01N 29/4409; G01N 29/4436; G01N 29/46; G01N 29/043; G01N 29/04; G01N 29/22; G01N 29/0654; G01N 29/24; G01N 29/44; B23K 20/08; B23K 31/125
See application file for complete search history.

(56) References Cited

U.S. PATENT DOCUMENTS

| | | | |
|---|---|---|---|
| 5,063,780 | A | 11/1991 | Landry et al. |
| 5,108,693 | A | 4/1992 | Landry et al. |
| 5,537,875 | A | 7/1996 | Viehmann et al. |
| 5,661,241 | A | 8/1997 | Harth, III et al. |
| 6,003,377 | A | 12/1999 | Waag et al. |
| 7,774,917 | B2 | 8/2010 | Anderson et al. |
| 8,166,821 | B2 | 5/2012 | Killian et al. |
| 9,134,280 | B2 | 9/2015 | Cataldo et al. |
| 9,146,205 | B2 | 9/2015 | Renshaw et al. |
| 11,422,116 | B2 * | 8/2022 | De Schutter ......... G01N 29/225 |
| 2010/0224000 | A1 * | 9/2010 | Komatsu ................ G01N 29/04 73/602 |
| 2011/0023609 | A1 | 2/2011 | Ume et al. |
| 2018/0106765 | A1 | 4/2018 | Kim et al. |

FOREIGN PATENT DOCUMENTS

| | | | | |
|---|---|---|---|---|
| CN | 102232085 | A | 11/2011 | |
| CN | 102639996 | A | 8/2012 | |
| CN | 103194747 | B | 3/2015 | |
| CN | 105388212 | A | 3/2016 | |
| CN | 103615995 | B | 5/2016 | |
| CN | 104975288 | B | 8/2017 | |
| CN | 105935769 | B | 11/2017 | |
| CN | 105441856 | B | 4/2018 | |
| CN | 105965212 | B | 4/2018 | |
| CN | 106048599 | B | 7/2018 | |
| CN | 105424804 | B | 9/2018 | |
| CN | 108932359 | A | 12/2018 | |
| EP | 1043584 | A1 | 10/2000 | |
| JP | 6251025 | B2 | 12/2017 | |
| JP | 2022526837 | A | 5/2022 | |
| KR | 101845882 | B1 * | 5/2018 | |
| KR | 20210143936 | A | 11/2021 | |
| WO | 2009152143 | A | 12/2009 | |
| WO | WO-2018143410 | A1 * | 8/2018 | ............... B06B 3/00 |
| WO | WO-2019201925 | A1 * | 10/2019 | ............ G01N 29/04 |
| WO | 2020214926 | A1 | 10/2020 | |

OTHER PUBLICATIONS

WO-2018143410-A1_translated (Year: 2018).*
KR-101845882-B1_translated (Year: 2018).*
Canadian Intellectual Property Office; Office Action for CA Application No. 3,136,934; dated Feb. 2, 2022; 4 pages.
Doosan Babcock Energy Limited; Evaluation of the effectiveness of non-destructive testing screening methods for in-service inspection; dated 2009; 180 pages.
European Patent Office; Rule 161 Communication for EP Application No. 20791575.2; dated Jan. 12, 2022; 3 pages.
International Searching Authority; International Search Report and Written Opinion for PCT/US2020028713; dated Aug. 25, 2020; 8 pages.
Tessonics; Resistance Spot Weld Analyzer, RSWA F1; dated Jan. 24, 2011; Retrieved from web Dec. 13, 2018; 1 page.
Ultramag Inspection Services; Ultrasonic Testing; dated Jun. 7, 2016; Retrieved from web Dec. 14, 2018; 2 pages.
Vogt Ultrasonics Gmbh; PHAsis PAUT Spotweld Inspection System; Retrieved from web Dec. 14, 2018; 3 pages.
Wilems, et al.; Introduction to Ultrasonic In-Line Inspection of CRA Pipelines; dated 2016; 11 pages.
European Patent Office; Extended European Search Report for EP Application No. 20791575.2; dated Nov. 23, 2022; 9 pages.
Finkel et al., Recent Developments in Explosive Welding, Materials and Design, Mar. 1, 2011, vol. 32, No. 3, 13 pages.
Intellectual Property India; First Examination Report for IN Application No. 202117049965; dated Sep. 23, 2022; 6 pages.
Japan Patent Office; Office Action for JP Application No. 2021-559919; dated Sep. 13, 2022; 8 pages.
China National Intellectual Property Administration; Office Action issued for Chinese Application No. 202080029656.X dated Apr. 4, 2024; 11 pages.

* cited by examiner

What makes these angular features different from the angular features in the weak bond SEM images?

What are these "fuzzy" bits or shards that show up in the sound bond SEM images? Are these indicative of sound bonds?

What makes this cracking different from the cracking the in weak bond SEM images?

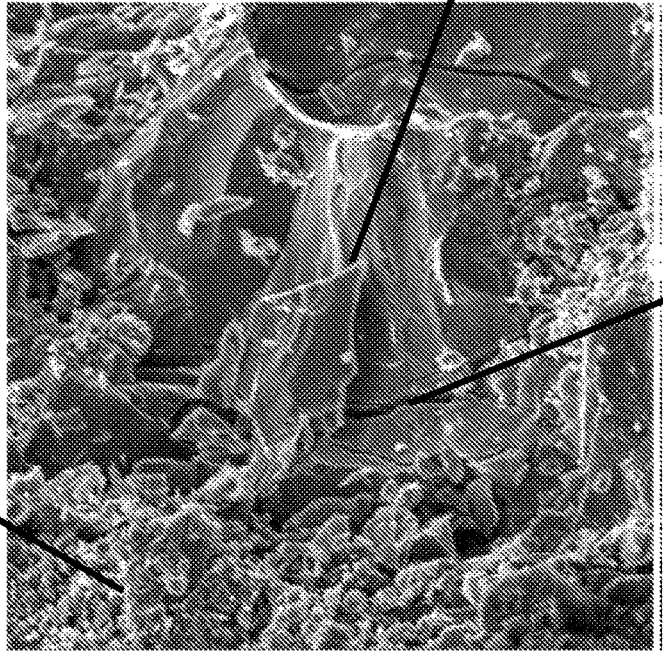

FIG. 22

Are these sound bond SEM images from the clad/reactive metal? Or from the base/steel metal?

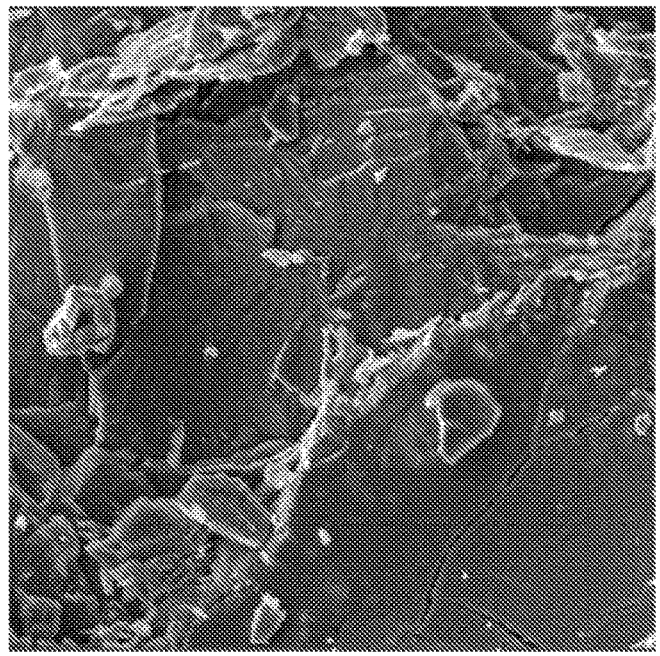

FIG. 23

METHOD AND SYSTEM OF IDENTIFYING A BOND BOUNDARY BETWEEN A SOUND BOND AND A WEAK BOND IN A MULTILAYER ARTICLE

CROSS-REFERENCE TO RELATED APPLICATIONS

This application is a national stage entry of International Application No. PCT/US2020/28713 filed Apr. 17, 2020, which claims the benefit of U.S. Provisional Patent Application No. 62/834,987, filed Apr. 17, 2019, the entire contents of which are incorporated herein by reference.

BACKGROUND OF THE DISCLOSURE

Many articles used in industry and commerce may include multilayer parts or materials, such as plastic coatings on metal, rubber coatings on metal, epoxy coatings on metal, plastic coatings on glass, or cladded metal parts. An important consideration in the quality of the multilayer parts or materials is the bond strength between layers in the multilayer parts or materials. For example, in the field of cladded metal articles such as explosively welded metals, one common standard is that the welded article should have a shear strength of at least 20 kilopounds per square inch (ksi).

Bond failure, i.e., a lack of bond between the layers, or weak bonds between the layers may affect the safety or utility of articles made from multilayer parts or materials. For example, weak or defective bonds may cause parts to wear out more quickly, leading to increased maintenance and replacement costs for the user. Additionally, weak or defective bonds in a multilayer part or article may result in a catastrophic failure, causing damage to machinery or injury to users.

Accordingly, it is helpful to test the quality of bonds in multilayer parts or materials before they are used. Non-destructive testing methods such as ultrasonic testing may be used for quality control in the manufacture of multilayer parts or materials. By analyzing the waveforms from the ultrasound test, boundaries between sound bond regions and defective bond regions can be identified and marked. The defective bond regions may then be repaired, if possible, or excised from the article and discarded.

While conventional non-destructive testing techniques may be able to identify areas of bond failure or lack of bonding between layers, the conventional techniques may have difficulty identifying areas of weak bonding. Accordingly, it may be desirable to develop methods and systems that are capable of more reliably identifying a bond boundary between a sound bond and a weak bond in a multilayer article.

BRIEF DESCRIPTION OF EXEMPLARY EMBODIMENTS

An exemplary embodiment of a method of identifying a bond boundary between a sound bond and weak bond in an article having a first layer and a second layer may include determining a plurality of positions on a surface of the article. The method may further include, for each position of the plurality of positions, obtaining a full-wave, time domain waveform of ultrasonic waves reflected from the article. The method may further include, for each pair of adjacent positions among the plurality of positions, determining whether there is a bond boundary between a first position of the pair of adjacent positions and a second position of the pair of adjacent positions based on a comparison of a waveform characteristic of a first waveform generated at the first position and the waveform characteristic of a second waveform generated at the second position. The method may further include, for each pair of adjacent positions among the plurality of positions and in response to a determination that there is a bond boundary between the first position and the second position, determining a boundary position based on one or both of the first position and the second position and memorializing the boundary position.

An exemplary embodiment of a system for identifying a bond boundary between a sound bond and weak bond in an article having a first layer and a second layer may include a tool head, an ultrasonic transducer mounted on the tool head in a fixed position, a motor system operably coupled to the tool head and structured to move the tool head along a two-dimensional plane parallel to a surface of the article, a position sensor configured to output a position signal indicative of a position of the tool head, and a controller operably coupled to the ultrasonic transducer, the motor system, and the position sensor. The controller may be configured to control the motor system to move the transducer to a plurality of positions along a surface of the article. The controller may be further configured to, for each position of the plurality of positions, identify coordinates of the position based on the position signal, control the transducer to transmit ultrasonic waves through the article, and generate a full-wave, time domain waveform based on reflected ultrasonic waves received by the transducer. The controller may be further configured to, for each pair of adjacent positions among the plurality of positions, determine whether there is a bond boundary between a first position of the pair of adjacent positions and a second position of the pair of adjacent positions based on a comparison of a waveform characteristic of the first waveform generated at the first position and the waveform characteristic of the second waveform generated at the second position. The controller may be further configured to, for each pair of adjacent positions among the plurality of positions, in response to a determination that there is a bond boundary, determine boundary coordinates based on one or both of the first position and the second position.

An exemplary embodiment of a non-transitory computer-readable storage medium may include computer-executable instructions that, when executed by a computer, cause the computer to acquire a first waveform associated with a first position on a surface of an article comprising a first layer and a second layer. The first waveform may be generated by transmitting ultrasonic waves through the article via a transducer and generating a full-wave, time domain waveform based on reflected ultrasonic waves received at the transducer. The computer-executable instructions may further cause the computer to acquire a second waveform associated with a second position on the surface of the article. The second waveform may be generated by transmitting ultrasonic waves through the article via a transducer and generating a full-wave, time domain waveform based on reflected ultrasonic waves received at the transducer. The computer-executable instructions may further cause the computer to determine whether there is a bond boundary between a first position of the pair of adjacent positions and a second position of the pair of adjacent positions based on a comparison of a waveform characteristic of a first waveform generated at the first position and the waveform characteristic of a second waveform generated at the second position; and in response to a determination that there is a bond boundary between the first position and the second position, determining a boundary position based on one or both of the first position and the second position and memorializing the boundary position.

BRIEF DESCRIPTION OF THE DRAWINGS

A more particular description will be rendered by reference to exemplary embodiments that are illustrated in the accompanying figures. Understanding that these drawings depict exemplary embodiments and do not limit the scope of this disclosure, the exemplary embodiments will be described and explained with additional specificity and detail through the use of the accompanying drawings in which:

FIG. 22 is scanning electron microscope micrograph of a bonding surface of a clad layer of a cladded article according to an exemplary embodiment;

FIG. 23 is scanning electron microscope micrograph of a bonding surface of a clad layer of a cladded article according to an exemplary embodiment;

Figure 1:
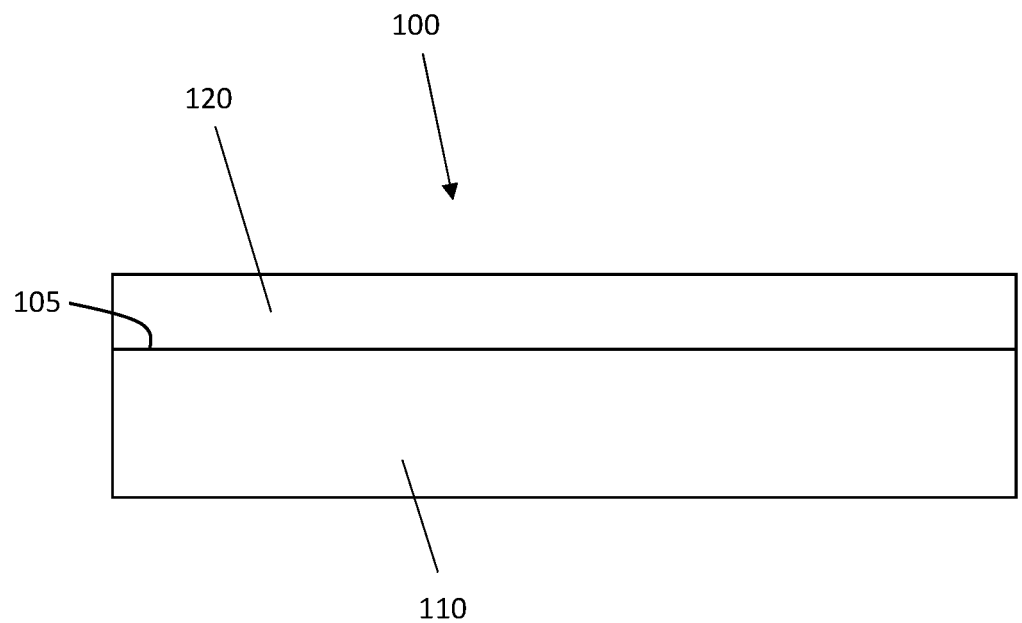
FIG. 1 is a schematic diagram of a multilayer article according to an exemplary embodiment.

Various features, aspects, and advantages of the exemplary embodiments will become more apparent from the following detailed description, along with the accompanying drawings in which like numerals represent like components throughout the figures and detailed description. The various described features are not necessarily drawn to scale in the drawings but are drawn to emphasize specific features relevant to some embodiments.

The headings used herein are for organizational purposes only and are not meant to limit the scope of the disclosure or the claims. To facilitate understanding, reference numerals have been used, where possible, to designate like elements common to the figures.

DETAILED DESCRIPTION

Reference will now be made in detail to various embodiments. Each example is provided by way of explanation and is not meant as a limitation and does not constitute a definition of all possible embodiments.

FIG. 1 shows an exemplary embodiment of an article 100 having a plurality of layers. The article 100 may include a base layer 110 and a clad layer 120 bonded to the base layer 110. The article may include an interface 105 between the base layer 110 and the clad layer 120, which may correspond to the bond between the base layer 110 and the clad layer 120.

In an exemplary embodiment, the article 100 may be a cladded metal article. The base layer 110 may be formed of a material such as stainless steel, carbon steel, titanium, nickel, aluminum, or alloys including any of these materials. In an exemplary embodiment, the clad layer 120 may be formed of materials such as aluminum, steel, titanium, zirconium, copper, silver, tantalum, or alloys including any of these materials. However, it will be understood that the base layer 110 and the clad layer 120 are not limited to these materials, and other materials may be used depending on the requirements of the specific application. The clad layer 120 may be bonded to the base layer 110 through a solid-state welding method, thereby forming interface 105 between the clad layer 120 and the first metallic layer 110. The interface 105 may be a region between the clad layer 120 and the base layer 110 where atoms from each of the clad layer 120 and the base layer 110 are diffused among each other.

Solid-state welding may include a group of welding processes producing bonds/welds between structural elements at temperatures below the melting point of the base materials being joined, without the addition of brazing filler metal. In an exemplary embodiment, solid-state welding may be described as a bonding/welding process (i) without putting a portion of the structural elements through liquid or vapor phase, (ii) with the use of pressure, and (iii) with or without the aid of temperature. Solid-state welding is done over a wide range of pressure and temperature, with appreciable deformation and solid-state diffusion of the base materials. Solid-state welding processes include cold welding, diffusion welding, explosion welding, forge welding, friction welding, hot pressure welding, roll welding, and ultrasonic welding.

In an exemplary embodiment, the solid-state welding between the base layer 110 and the clad layer 120 may be explosion welding. Explosion welding ("EXW") is a solid-state welding technique using controlled detonations to force dissimilar metals into a high-quality, metallurgically bonded joint. The transition joint between the dissimilar metals has high mechanical strength, is ultra-high vacuum tight and can withstand drastic thermal excursions. EXW is a solid-phase process where welding or cladding two metals together is accomplished by accelerating one of the components at extremely high velocity through the use of explosives. The process is solid phase because both components are, at all times, in a solid state of matter.

While the article 100 is described above as a solid-state welded article, and more specifically an explosively-welded article, it will be understood that the embodiments described herein may also be applied to other types of articles, such as traditionally welded metals, articles having a metallic layer and a non-metallic layer, and articles having two non-metallic layers.

Figure 2:
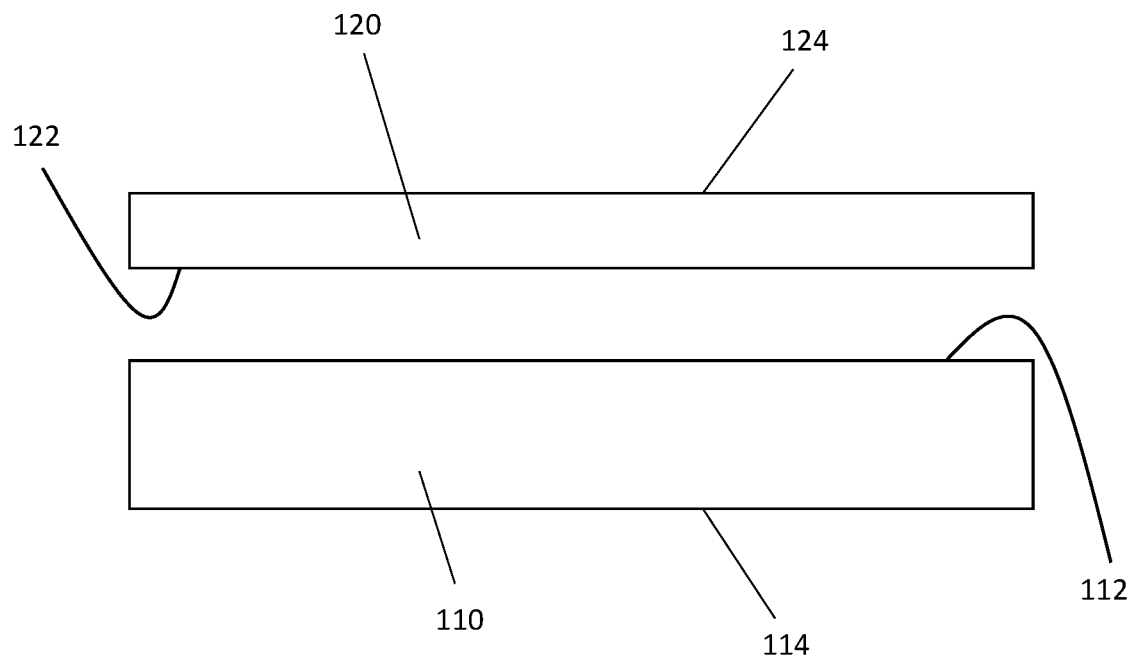
FIG. 2 is an exploded schematic diagram of a multilayer article according to an exemplary embodiment.

FIG. 2 shows an exploded view of the article 100. As seen in FIG. 2, the base layer 110 may include a base layer bonding surface 112 and a base layer outer surface 114. Additionally, the clad layer 120 may include a clad layer bonding surface 122 and a clad layer outer surface 124. When the base layer 110 and the clad layer 120 are bonded together, either of the base layer outer surface 114 and the clad layer outer surface 124 may be considered a surface of the article 100 for the purposes of the embodiments described herein.

Figure 3:
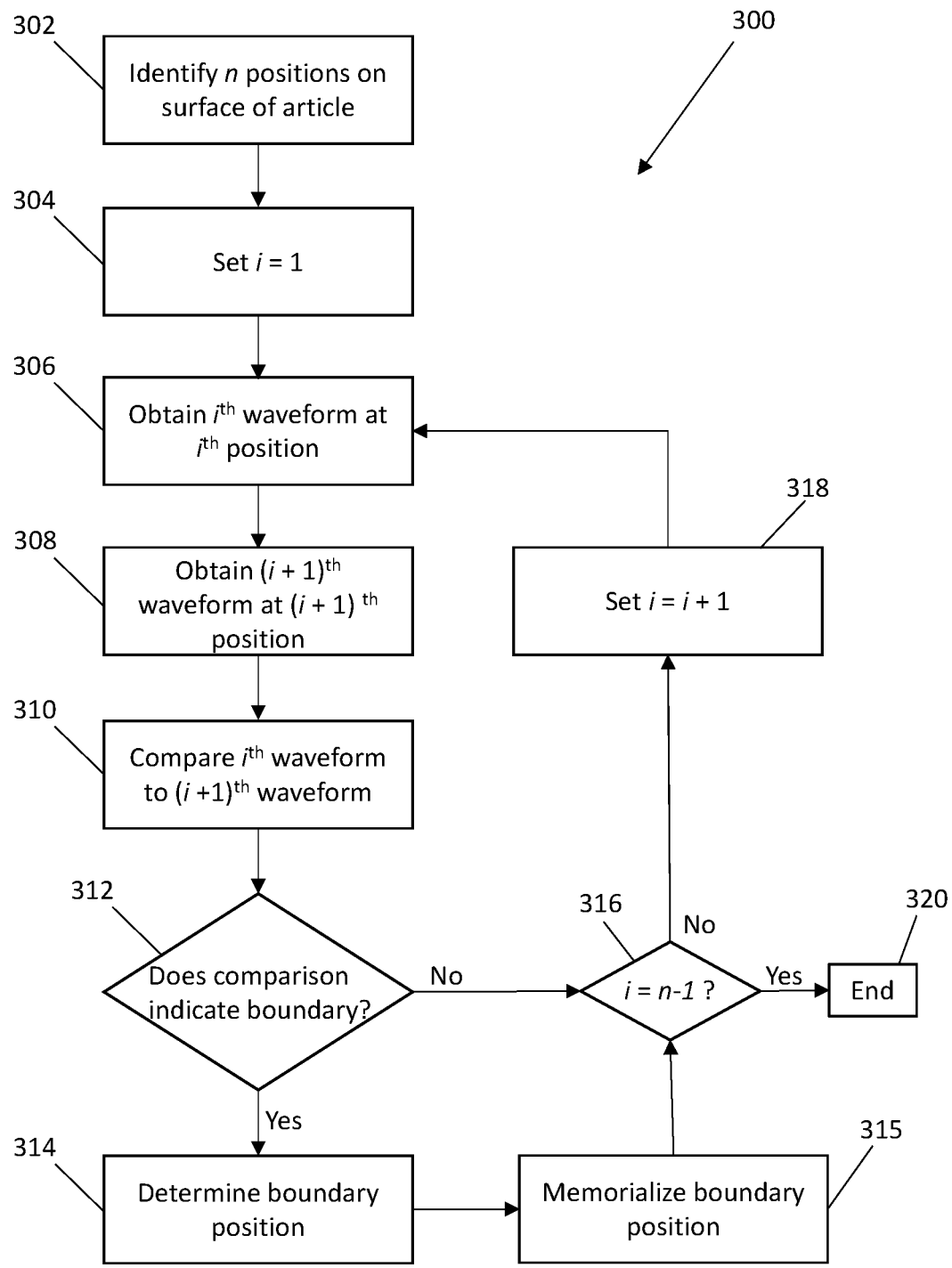
FIG. 3 is a flowchart of a method of identifying a bond boundary between a sound bond and weak bond according to an exemplary embodiment.
Figure 7:
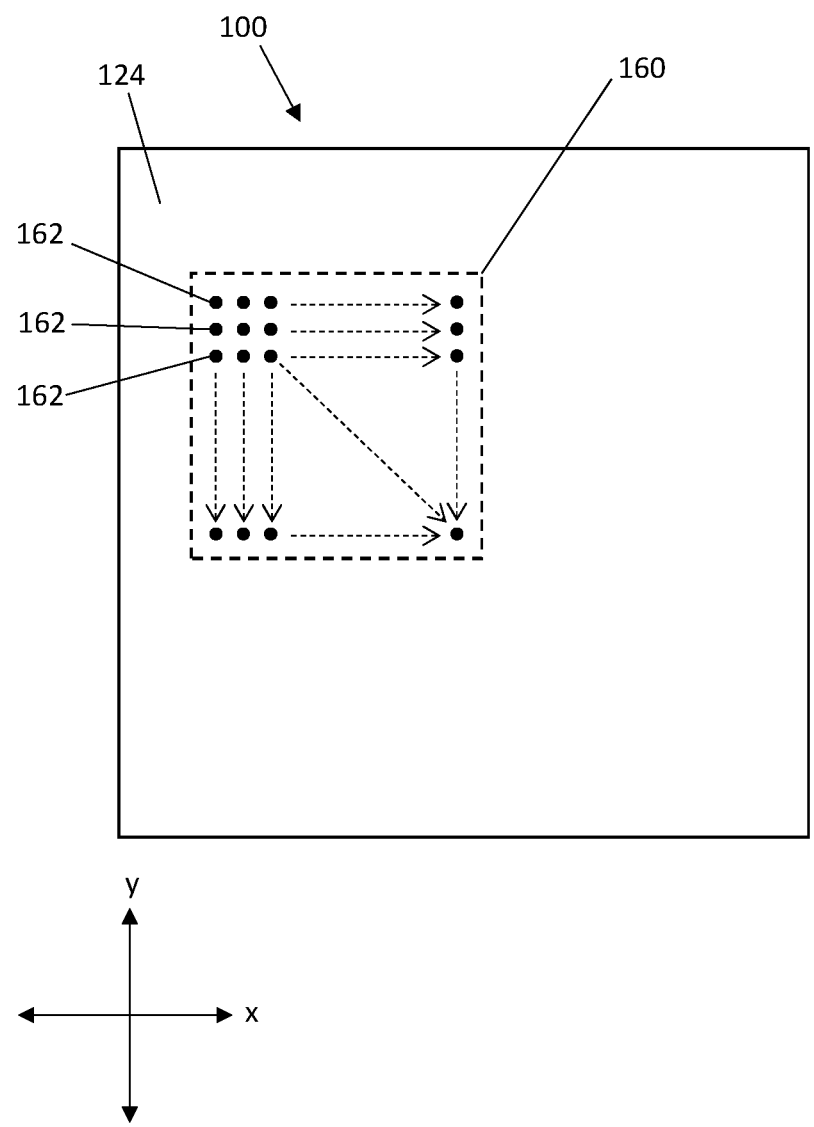
FIG. 7 is a schematic diagram of a surface of a multilayer article according to an exemplary embodiment.

FIG. 3 shows an exemplary embodiment of a method 300 of identifying a boundary between a sound bond between the base layer 110 and the clad layer 120 and a weak bond between the base layer 110 and the clad layer 120 in the article 100 as seen in FIGS. 1-2. The term "boundary" may refer to a position in the x-y plane (see FIG. 7) where the interface between the clad layer 120 and the base layer 110 transitions from a sound bond to a weak bond. In block 302, a total of n positions is identified on a surface of the article 100, n being an integer number greater than or equal to 2. FIG. 7 shows an exemplary embodiment in which a plurality of positions 162 have been identified within a test region 160 on the clad layer outer surface 124 of the article 100. While FIG. 7 shows the positions 162 arranged on the clad layer outer surface 124, the positions 162 may be identified on the base layer outer surface 114 in an alternative exemplary embodiment. The positions 162 may be arranged with a constant interval between each position 162, or there may be a varying interval between the positions 162. Additionally, in an exemplary embodiment, there may only be a need to test a subset of the article 100, and the positions 162 may only be identified in the test region 160, as seen in FIG. 7. In another exemplary embodiment, it may be desired to test the entirety of the article 100, and the positions 162 may be identified across the entire clad layer outer surface 124.

Returning to FIG. 3, in block 304, a parameter i is set equal to 1. In block 306, an $i^{th}$ waveform corresponding to an $i^{th}$ position 162 of the plurality of positions 162 is obtained. The $i^{th}$ waveform may be a time domain waveform of intensity of reflected ultrasonic waves at the $i^{th}$ position. In an exemplary embodiment, the $i^{th}$ waveform may be a full-wave waveform. A full-wave waveform is an unrectified waveform of the reflected ultrasonic waves, showing both positive and negative amplitudes. A first waveform 700 shown in FIG. 8 and a second waveform 800 shown in FIG. 9 are exemplary embodiments of full-wave, time domain waveforms. Obtaining the $i^{th}$ waveform may include retrieving a waveform from a digital storage, or obtaining a real-time waveform using an ultrasound transducer. The transducer may be handheld or may be mounted on an automated system. Table 1 below identifies exemplary embodiments of types of transducers that may be used as well as exemplary embodiments of parameters associated with the transducers.

TABLE 1

Exemplary embodiments of transducers and related parameters

| Parameters | 1" Single Transducer | 0.5" Single Transducer, Full Wave | 0.5" Single Transducer, Rectified Wave | 0.25" Delayed Tip Transducer, 0.415" polymethylmethacrylate |
|---|---|---|---|---|
| Energy (V) | 100 | 100 | 100 | 100 |
| Damp (Ω) | 50 | 50 | 50 | 50 |
| Frequency (MHz) | 2.25 | 5 | 5 | 5 |
| Filter (MHz) | 1.5-8.5 | 5-15 | 5-15 | 5-15 |
| Velocity (in/μs) | 0.2400 | 0.2400 | 0.2400 | 0.2400 |
| Zero (μs) | 0.881 | 0.881 | 0.881 | 0.881 |
| Range (inch) | 1.00 | 1.00 | 1.00 | 1.092 |
| Delay (inch) | 0.00 | 0.00 | 0.00 | 1.087 |

It will be understood that the transducers and parameters listed in Table 1 are exemplary only, and that other types of transducers and/or values for the noted parameters may be used.

In block 308 of FIG. 3, an $(i+1)^{th}$ waveform is obtained. Similar to the $i^{th}$ waveform, obtaining the $(i+1)^{th}$ waveform may include retrieving a waveform from a digital storage, or obtaining a live waveform using an ultrasound transducer. In an exemplary embodiment, the $i^{th}$ waveform and the $(i+1)^{th}$ waveform may be obtained using the same transducer. For example, the transducer may be moved to the $i^{th}$ position and obtain the $i^{th}$ waveform, then be moved to the $(i+1)^{th}$ position and obtain the $(i+1)^{th}$ waveform. The transducer may be moved discretely to each position or may move continuously through each position and obtain waveforms while being moved.

In block 310, the $i^{th}$ waveform is compared to the $(i+1)^{th}$ waveform, and in block 312, it is determined whether the comparison performed in block 310 indicates a boundary between a sound bond between the base layer 110 and the clad layer 120 and a weak bond between the base layer 110 and the clad layer 120 (see FIGS. 1-2). Further details regarding the comparison in block 310 and the determination in block 312 will be explained in detail herein. If the comparison does indicate a bond boundary (i.e., "yes" at block 312), the method 300 proceeds to block 314. If the comparison does not indicate a bond boundary (i.e., "no" at block 312), the method 300 proceeds to block 316.

Figure 10:
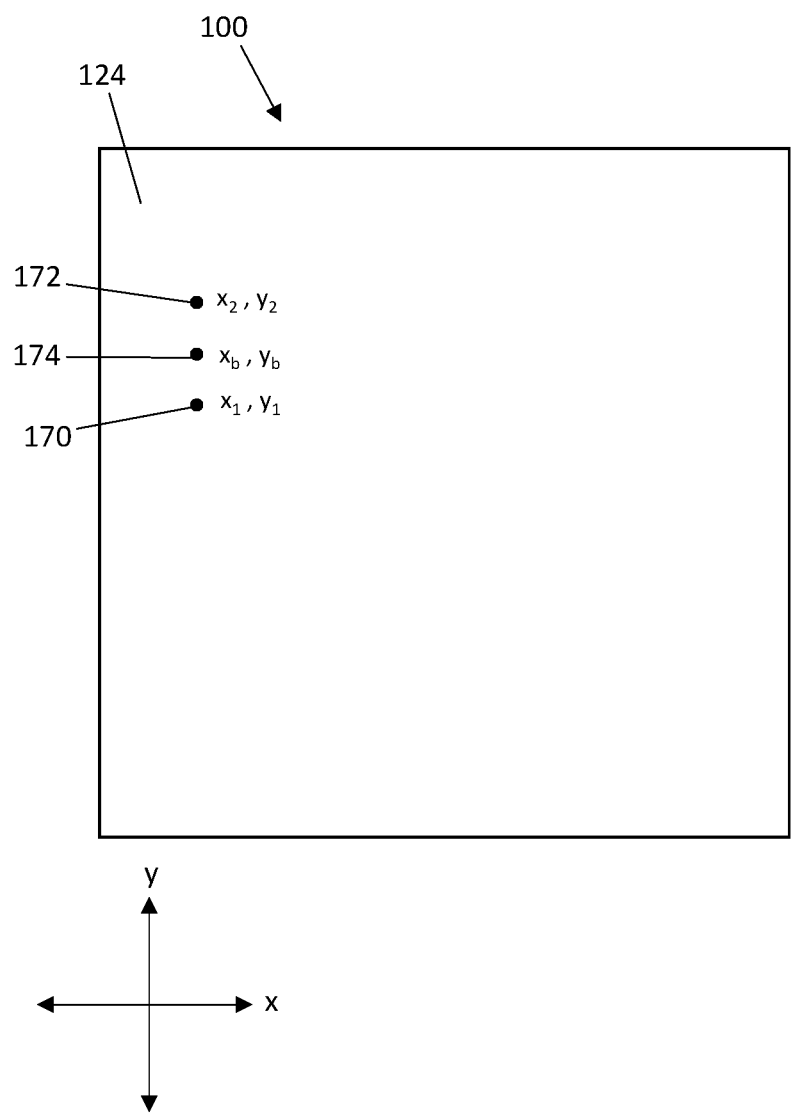
FIG. 10 is a schematic diagram of a surface of a multilayer article according to an exemplary embodiment.

In block 314, a position of the bond boundary is determined based on one or both of the $i^{th}$ position and the $(i+1)^{th}$ position. For example, FIG. 10 shows an example of a first position 170 having coordinates $x_1$, $y_1$ and a second position 172 having coordinates $x_2$, $y_2$. A boundary position 174 between the first position 170 and the second position 172 may have coordinates $x_b$, $y_b$. The x-coordinate $x_b$ of the boundary position 174 may fall within the range $[x_1, x_2]$ (endpoints included), and the y-coordinate $y_b$ of the boundary position 174 may fall within the range $[y_1, y_2]$ (endpoints included). In an exemplary embodiment, the coordinates of the boundary position 174 may be set as a midpoint between the first position 170 and the second position 172. Alternatively, depending on the preferences and needs of the user, the coordinates of the boundary position 174 may be set anywhere between and including the first position 170 and the second position 172.

In block 315, the boundary position is memorialized. In an exemplary embodiment, the memorialization may be manual. For example, a user examining the article 100 (see FIGS. 1-2) with a transducer may mark the clad layer outer surface 124 with a writing utensil, a portable surface printer, or another suitable marking tool when a comparison of waveforms indicates a bond boundary. Alternatively, if an automated system is being used, the system may include a writing utensil, a surface printer, a laser etcher, or another suitable marking tool to physically mark the boundary position on the article 100. Alternatively, memorialization of the boundary position may include electronically storing the coordinates of the boundary position as data in a storage medium.

In block 316, it is determined whether the parameter i is equal to a value n−1. If i is equal to n−1 ("yes" in block 316), the method 300 proceeds to block 320, where the method ends. If i does not equal n−1 ("no" in block 316), then the method 300 proceeds to block 318 where i is incremented by 1. The method 300 then returns to block 306.

Figure 4:
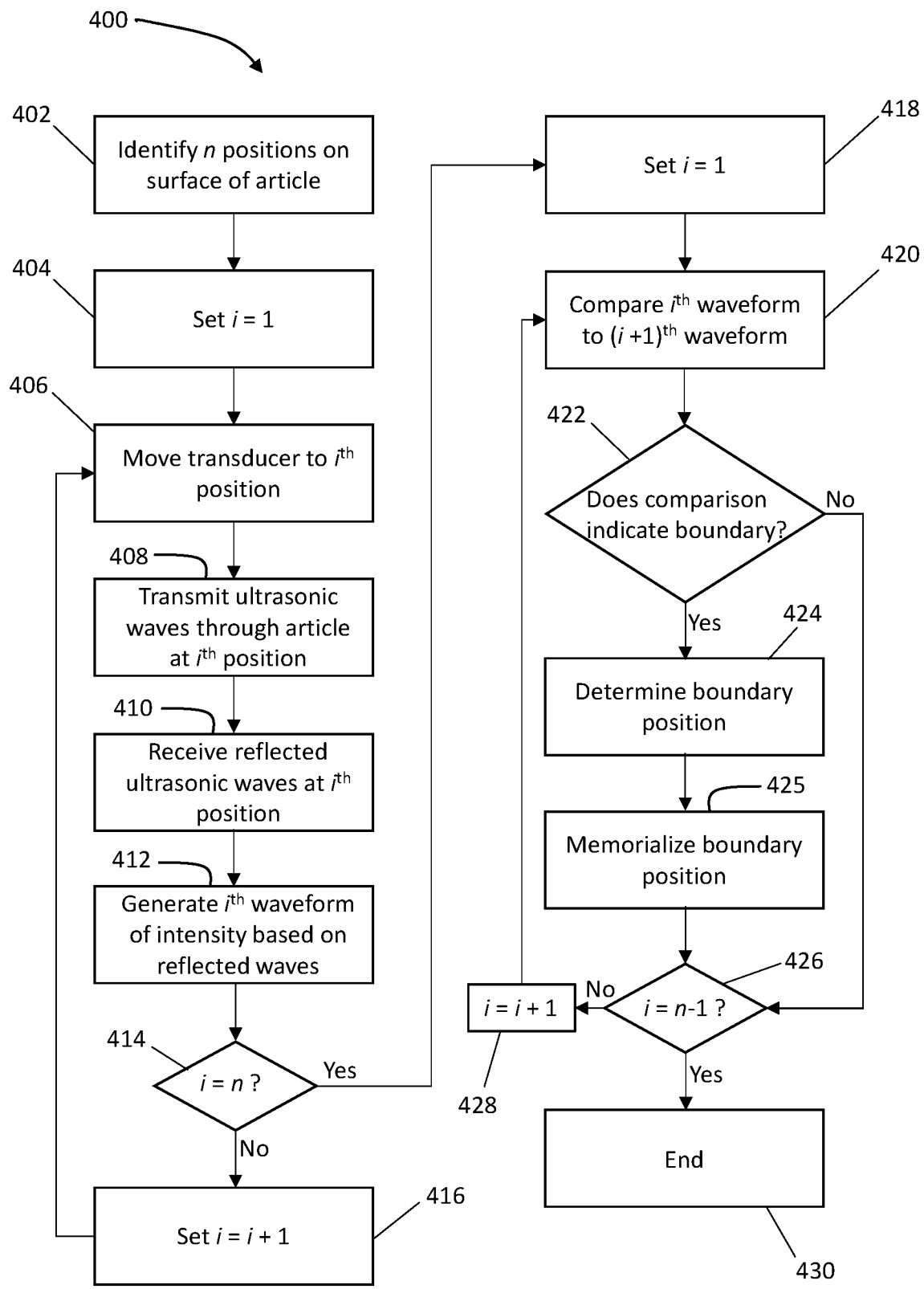
FIG. 4 is a flowchart of a method of identifying a bond boundary between a sound bond and weak bond according to an exemplary embodiment.

FIG. 4 illustrates another exemplary embodiment of a method 400 of identifying a boundary between a sound bond between the base layer 110 and the clad layer 120 and a weak bond between the base layer 110 and the clad layer 120 in the article 100 as seen in FIGS. 1-2. As will be explained in detail herein, the method 400 obtains waveforms at all positions 162 and then cycles through the waveforms to compare them. This may be beneficial when using an automated system that can store the waveforms electronically in a storage medium, as the boundary positions can later be calculated and linked to identifying information (such as a serial number or batch number) of the article being tested. This would facilitate a higher throughput of the automated system by eliminating the time needed to compare waveforms and physically mark boundary positions on the article.

In block 402, a total of n positions is identified on a surface of the article 100, n being an integer number greater than or equal to 2. In block 404, a parameter i is set equal to 1. In block 406, a transducer, such as one of the transducers described in Table 1 or another suitable transducer, is moved to the $i^{th}$ position of n positions. In block 408, ultrasonic waves are transmitted through the article 100 via the transducer. In block 410, reflected ultrasonic waves are received at the transducer at the $i^{th}$ position. In block 412, an $i^{th}$ waveform corresponding to an $i^{th}$ position is obtained. The $i^{th}$ waveform may be a time domain waveform of intensity of reflected ultrasonic waves at the $i^{th}$ position. As part of generating the $i^{th}$ waveform in block 412, the $i^{th}$ waveform may be electronically stored as data in a storage medium.

In block 414, it is determined whether the parameter i is equal to n. If the parameter i is not equal to n ("no" at block 414), the method 400 proceeds to block 416. In block 416, the parameter i is incremented by 1, and the method 400 returns to block 406. If the parameter i is equal to n ("yes" in block 414), the method 400 proceeds to block 418.

In block 418, the parameter i is reset to 1. In block 420, the $i^{th}$ waveform is compared to the $(i+1)^{th}$ waveform. As part of block 420, the $i^{th}$ waveform and the $(i+1)^{th}$ waveform may need to be retrieved from electronic storage. In block 422, it is determined whether the comparison performed in block 420 indicates a bond boundary. Further details regarding the comparison in block 420 and the determination in block 422 will be explained in detail herein. If the comparison does indicate a bond boundary (i.e., "yes" at block 422), the method 400 proceeds to block 424. If the comparison does not indicate a bond boundary (i.e., "no" at block 422), the method 400 proceeds to block 426.

In block 424 a boundary position of the bond boundary is determined. Determination of the bond boundary is similar to the method as described above regarding block 314 of FIG. 3. In block 425, the boundary position is memorialized. Memorialization of the bond boundary is similar to the method as described above regarding block 315 of FIG. 3.

In block 426, it is determined whether the parameter i is equal to a value n−1. If i is equal to n−1 ("yes" in block 426), the method 400 proceeds to block 430, where the method 400 ends. If i does not equal n−1 ("no" in block 426), then the method 400 proceeds to block 428 where i is incremented by 1. The method 400 then returns to block 420 where the next pair of waveforms are compared.

Figure 5:
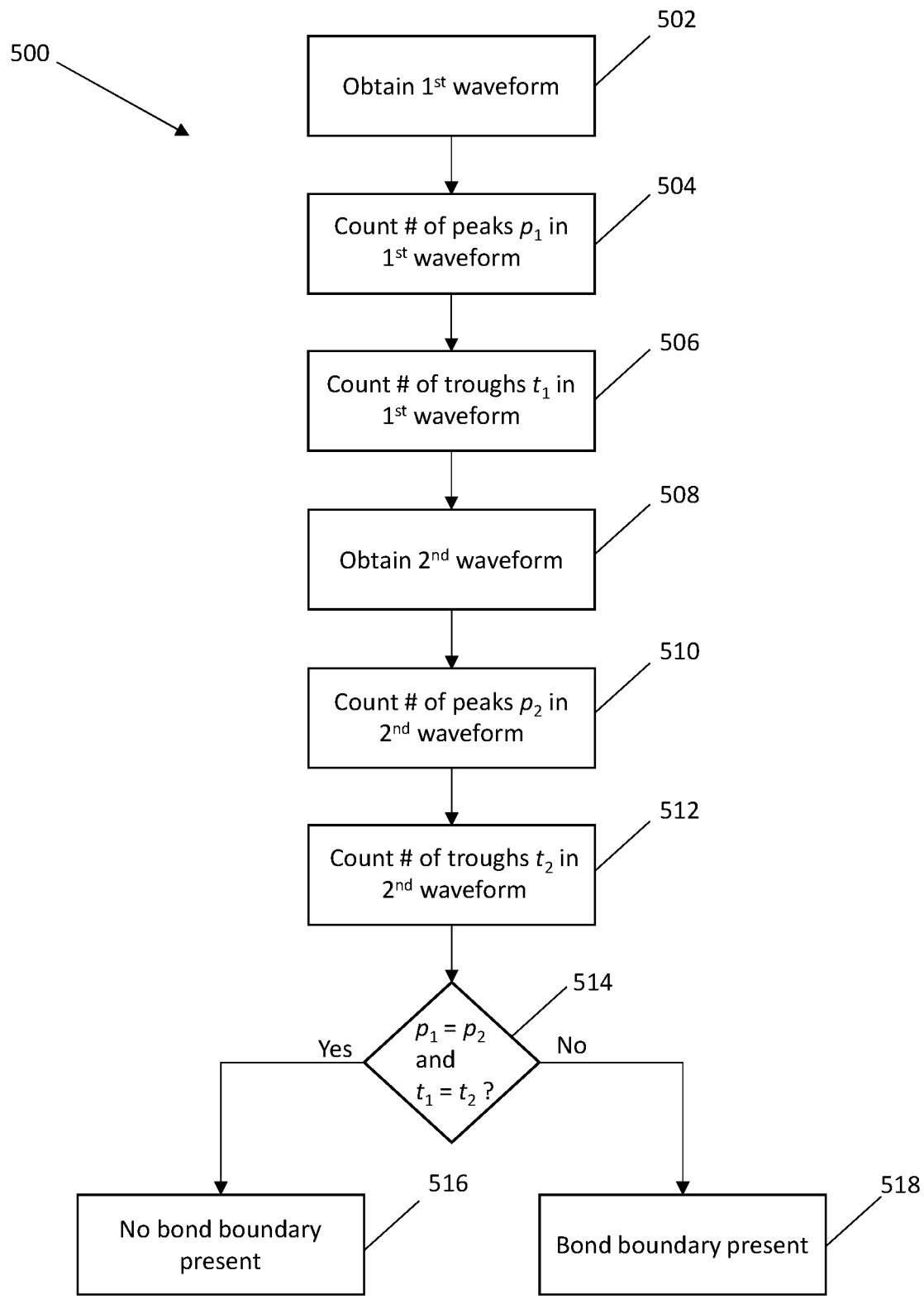
FIG. 5 is a flowchart of a method of comparing characteristics of waveforms and determining whether a bond boundary exists between two points according to an exemplary embodiment.

FIG. 5 illustrates an exemplary embodiment of a method 500 of comparing characteristics of waveforms and determining whether a bond boundary exists between two points. The method 500 may include elements corresponding to block 310 and 312 of FIG. 3 or block 420 and block 422 of FIG. 4. In describing the method 500, reference will also be made to the first waveform 700 illustrated in FIG. 8 and the second waveform 800 illustrated in FIG. 9.

Returning to FIG. 5, in block 502 the first waveform 700 is obtained. The first waveform 700 may be obtained by using an ultrasonic transducer as described in detail above. Alternatively, the first waveform 700 may be retrieved from a storage medium as electronic data.

Figure 8:
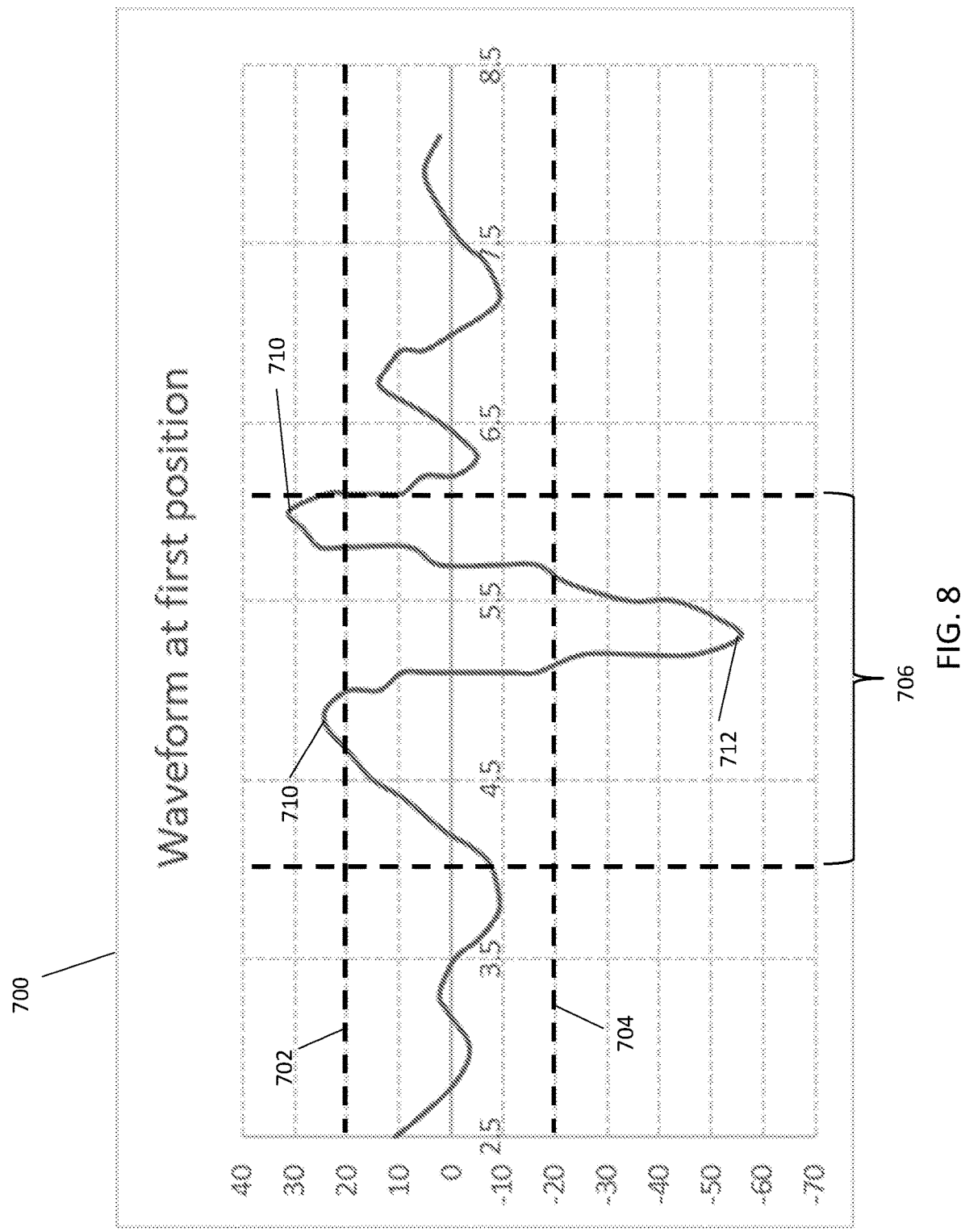
FIG. 8 is a schematic diagram of an ultrasound waveform of a multilayer article according to an exemplary embodiment.
Figure 9:
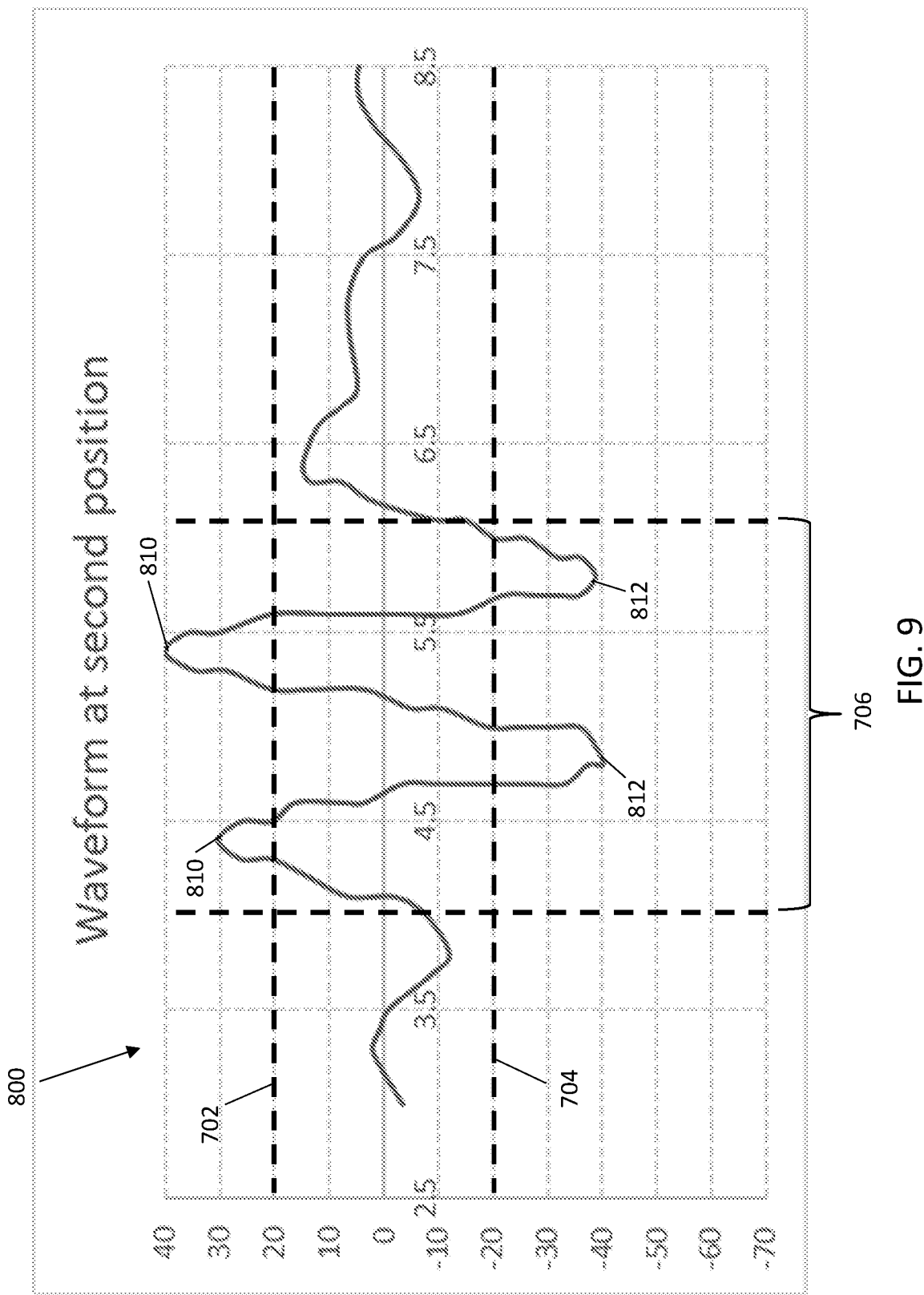
FIG. 9 is a schematic diagram of an ultrasound waveform of a multilayer article according to an exemplary embodiment.

In block 504, a first number of peaks $p_1$ is counted in the first waveform 700 (i.e., the peaks 710 shown in FIG. 8). In an exemplary embodiment, the first number of peaks $p_1$ may be counted in a subset of the first waveform 700 corresponding to a predetermined range 706 of values along an x-axis of the first waveform 700. The predetermined range 706 may correspond to values in the time domain where one would expect to see ultrasonic waves reflected from the interface between the clad layer 120 and the base layer 110. For example, in an exemplary embodiment, it may be assumed that the transducer is placed on the clad layer 120. Knowing the thickness of the clad layer 120 and the speed of sound in the material of the clad layer 120, it can be calculated how long it would take ultrasonic waves to travel from the transducer to the interface between the clad layer 120 and the base layer 110 and back to the transducer. This time period may be used to calculate a midpoint of the predetermined range 706. A width of the predetermined range 706 may be calculated based on manufacturing tolerances in the thickness of the clad layer 120 and/or an estimated thickness of the interface between the clad layer 120 and the base layer 110, and then converting these distance values into corresponding values in the time domain of the waveform based on the speed of sound in the material of the clad layer 120. Other factors that may affect calculation of the midpoint and/or width of the predetermined range may include the type of transducer being used (i.e., single element, dual element, delay tip, etc.) and/or the style of ultrasound being employed (i.e., contact, immersion, water column, etc.). Alternatively or additionally, a user may perform a calibration procedure before testing, either on the article being tested or a known sample, in order to determine or confirm an appropriate value for the predetermined range 706. For example, the interface between the clad layer 120 and the base layer 110 may be visually identified on the ultrasound waveform in order to set the predetermined range 706. Using the predetermined range 706, FIG. 8 shows that the first number of peaks $p_1$ (labeled 710 in FIG. 8) is equal to 2 for the first waveform 700.

In another exemplary embodiment, the first number of peaks $p_1$ may be a number of peaks higher than a predetermined first threshold 702 corresponding to a y-value of the first waveform 700. The predetermined first threshold 702 may be determined based on a power level of the transducer being used, the specific materials forming the base layer 110 and the clad layer 120 (see FIGS. 1-2), thickness of the base layer 110 and the clad layer 120, and/or other factors that may affect the propagation of the ultrasonic waves. In an exemplary embodiment, a user may perform a calibration procedure before testing, either on the article being tested or a known sample, in order to determine an appropriate level for the first threshold 702. Using the first threshold 702, FIG. 8 shows that the first number of peaks $p_1$ is equal to 2 for the first waveform 700.

Returning to FIG. 5, in block 506, a first number of troughs $t_1$ is counted in the first waveform 700 (labeled 712 in FIG. 8). In an exemplary embodiment, the first number of troughs $t_1$ may be counted in a subset of the first waveform 700 corresponding to the predetermined range 706 of values along an x-axis of the first waveform 700. Using the predetermined range 706, FIG. 8 shows that the first number of troughs $t_1$ (labeled 712 in FIG. 8) is equal to 1 for the first waveform 700. Alternatively, the first number of troughs $t_1$ may be a number of troughs less than a predetermined second threshold 704. In an exemplary embodiment, the second threshold may be a negative value of the first threshold 702. Alternatively, the second threshold 704 may be independently determined based on a power level of the transducer being used, the specific materials forming the base layer 110 and the clad layer 120 (see FIGS. 1-2), thickness of the base layer 110 and the clad layer 120, and/or other factors that may affect the propagation of the ultrasonic waves. In an exemplary embodiment, a user may perform a calibration procedure before testing, either on the article being tested or a known sample, in order to determine an appropriate level for the second threshold 704. Using the second threshold 704, FIG. 8 shows that the first number of troughs $t_1$ is equal to 1 for the first waveform 700.

In block 508, the second waveform 800 corresponding to a different position is obtained in similar fashion as in block 502. In block 510, a second number of peaks $p_2$ (peaks labeled as 810 in FIG. 9) is counted for the second waveform 800 in similar fashion as in block 504. In counting the second number of peaks $p_2$, the first threshold 702 or the predetermined range 706 used to count the first number of peaks $p_1$ may be used. In block 512, a second number of troughs $t_2$ (troughs labeled as 812 in FIG. 9) is counted for the second waveform 800 similar fashion as in block 506. In counting the second number of troughs $t_2$, the second threshold 704 or the predetermined range 706 used to count the first number of troughs $t_1$ may be used.

In block 514, it is determined whether the first number of peaks $p_1$ is equal to the second number of peaks $p_2$ and whether the first number of troughs $t_1$ is equal to the second number of troughs $t_2$. If both equalities are true ("yes" in block 514), then the method 500 proceeds to block 516 where it is determined that no bond boundary is present. If either equality is untrue ("no" in block 514), then the method 500 proceeds to block 518 where it is determined that there is a bond boundary present.

Figure 6:
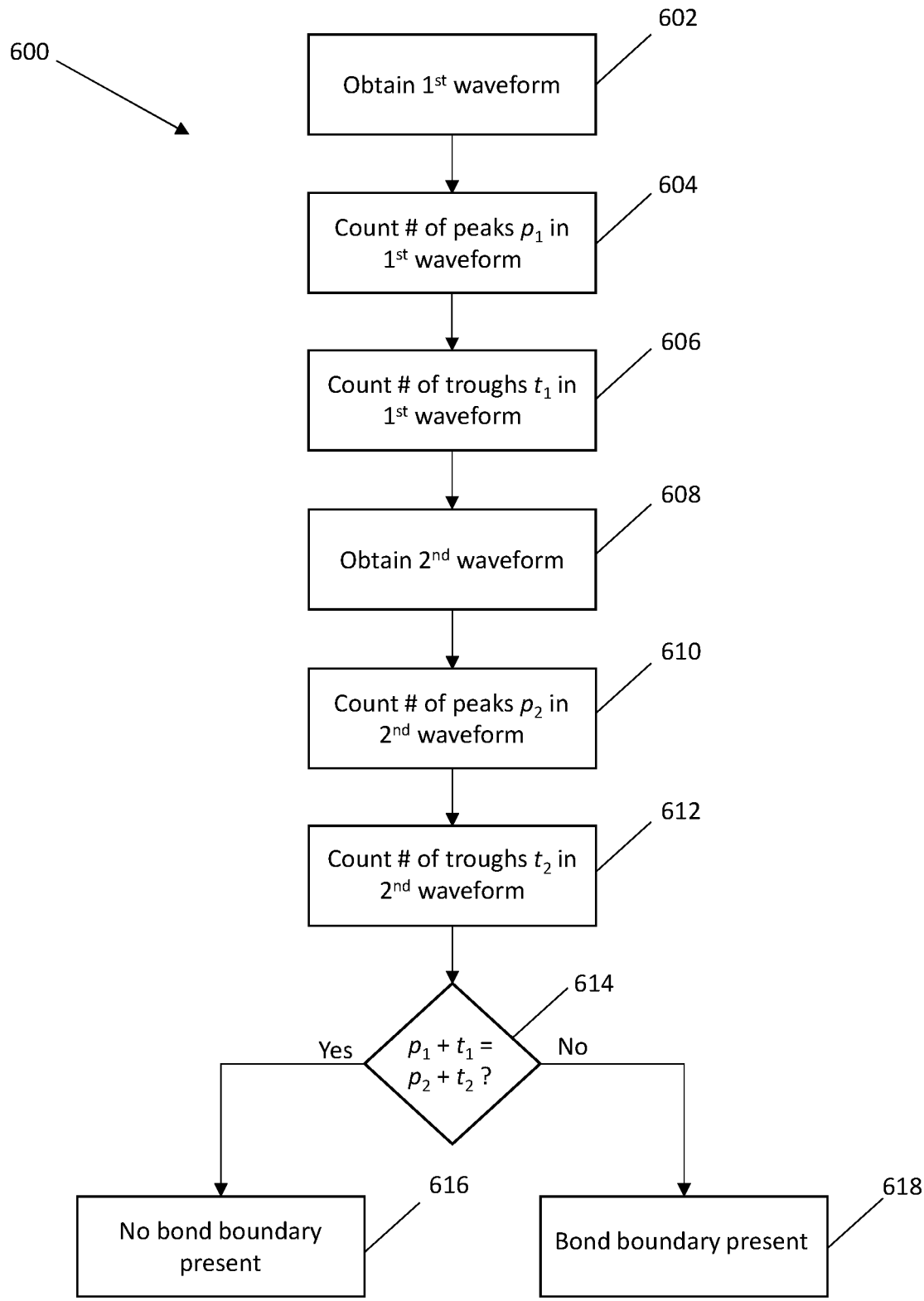
FIG. 6 is a flowchart of a method of comparing characteristics of waveforms and determining whether a bond boundary exists between two points according to an exemplary embodiment.

FIG. 6 shows an exemplary embodiment of a method 600 of comparing characteristics of waveforms and determining whether a bond boundary exists between two points. In FIG. 6, blocks 602 through 612 are identical to blocks 502 through 512 of FIG. 5. In block 614 of FIG. 6, it is determined whether a first sum of the first number of peaks $p_1$ and the first number of troughs $t_1$ is equal to a second sum of the second number of peaks $p_2$ and the second number of troughs $t_2$. If the equality in block 614 is true ("yes" in block 614), then the method 600 proceeds to block 616, where it is determined that no bond boundary is present. If the equality in block 614 is not true ("no" in block 614), then the method 600 proceeds to block 618, where it is determined that there is a bond boundary present.

Figure 30:
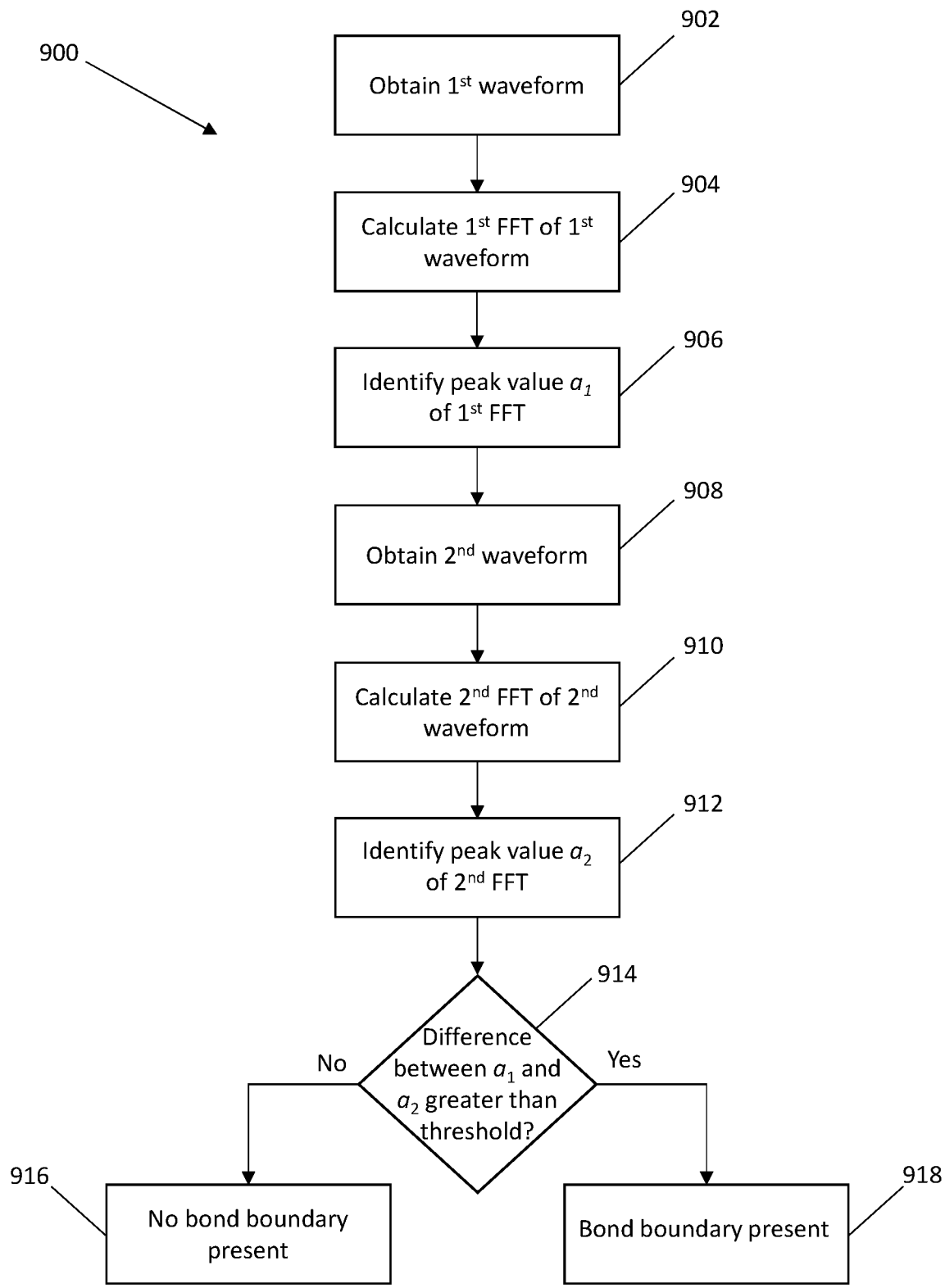
FIG. 30 is a flowchart of a method of comparing characteristics of waveforms and determining whether a bond boundary exists between two points according to an exemplary embodiment.

FIG. 30 shows an exemplary embodiment of a method 900 of comparing characteristics of waveforms and determining whether a bond boundary exists between two points. In the method 500 and the method 600 described above, the characteristics of the waveform 700 and the waveform 800 were the number of peaks and troughs. In contrast, the characteristics compared in the method 900 shown in FIG. 30 are the component frequencies of the waveform as determined by a fast Fourier transform (FFT).

Figure 31:
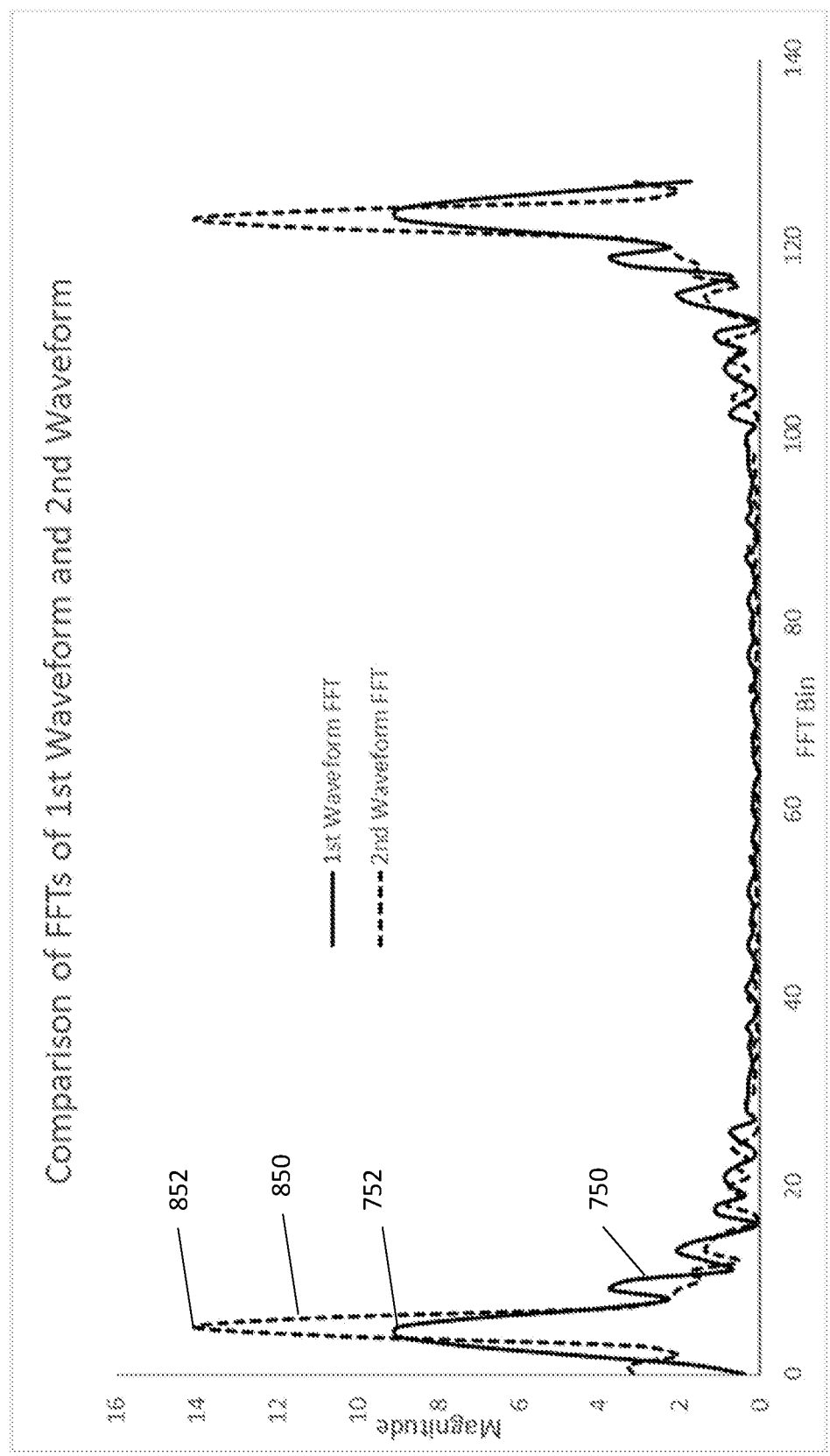
FIG. 31 is a graph comparing fast Fourier transforms of ultrasound waveforms of a cladded article according to an exemplary embodiment.

In block 902, the first waveform 700 is obtained. The acquisition of the first waveform 700 in block 902 may be accomplished in similar fashion as in block 502 of FIG. 5 or block 602 of FIG. 6. In block 904, a first waveform FFT 750 of the first waveform 700 is calculated, as shown by the solid line curve in FIG. 31. The first waveform FFT 750 may be generated by known FFT algorithms.

In block 906, a first peak value $a_1$ is identified. The first peak value $a_1$ may correspond to a magnitude at a first maximum peak 752 of the first waveform FFT 750 (see FIG. 31). While FIG. 31 may appear to show two maximum peaks for the first waveform FFT 750, it will be understood that many FFT algorithms will generate a symmetrical curve when operating on a set of real number data, as opposed to operating on a set of complex number data. Accordingly, it may be sufficient to only identify a single first maximum peak 752 of the first waveform FFT 750. In the specific example shown in FIG. 31, the first peak value $a_1$ of the first maximum peak 752 was calculated to be 9.04.

In block 908, the second waveform 800 is obtained. The acquisition of the second waveform 800 in block 908 may be accomplished in similar fashion as in block 508 of FIG. 5 or block 602 of FIG. 6. In block 910, a second waveform FFT 850 of the second waveform 800 is calculated, as shown by the broken line curve in FIG. 31. The second waveform FFT 850 may be generated by known FFT algorithms.

In block 912, a second peak value $a_2$ is identified. The second peak value $a_2$ may correspond to a magnitude at a second maximum peak 852 of the second waveform FFT 850 (see FIG. 31). In the specific example shown in FIG. 31, the second peak value $a_2$ of the second maximum peak 852 was calculated to be 14.08.

In block 914, it is determined whether a difference b between the first peak value $a_1$ and the second peak value $a_2$ is greater than a predetermined FFT threshold. The predetermined FFT threshold may be based on the average variation in peak value in a known sound bond sample. For example, if a calibration process determines that a known sound bond sample has a variation in FFT peak value of 5%, then the predetermined FFT threshold may be a multiple of this. For example, in an exemplary embodiment, the predetermined FFT threshold may be 10%, 15%, or 20% or more of the peak value. In an exemplary embodiment, the difference b may be calculated as merely a straight difference between the first peak value $a_1$ and the second peak value $a_2$, as given by the equation (1):

$$b = |a_1 - a_2| \tag{1}$$

In an alternative exemplary embodiment, the difference b may be represented as a percentage difference based on the first peak value $a_1$ or the second peak value $a_2$. For example, the difference b may be given by the equation (2):

$$b = \frac{|a_1 - a_2|}{a_1} \tag{2}$$

It will be noted that the denominator in equation (2) may be replaced by the second peak value $a_2$ or alternatively a mean value of the first peak value $a_1$ and the second peak value $a_2$.

Returning to block 914, if it is determined that the difference b between the first peak value $a_1$ and the second peak value $a_2$ is greater than the predetermined FFT threshold ("yes" in block 914), then the method 900 proceeds to block 918 where it is determined that a bond boundary is present. If is determined that the difference b is not greater than the predetermined FFT threshold ("no" in block 914), then the method 900 proceeds to block 916, where it is determined that no bond boundary is present. In the specific example shown in FIG. 31, the difference b is 5.04, or 55.8% of the first peak value $a_1$. Assuming a predetermined FFT threshold of 20%, this would indicate that there is a bond boundary between the position corresponding to the first waveform 700 and the position corresponding to the second waveform 800.

In the method 900 described above, the peak values of the FFT waveforms are compared. However, it will be understood that other characteristics of the FFT waveforms may also be compared. For example, in an exemplary embodiment, the values at a predetermined bin of the FFT waveforms may be compared, instead of values at the peak. Alternatively, in an exemplary embodiment, x-axis values of the peaks of the FFT waveforms (i.e., peak locations) may be compared. If the peak locations of two FFT waveforms vary by more than a predetermined number of bins, then it may be determined that a bond boundary exists between the points corresponding to the two FFT waveforms.

Figure 11:
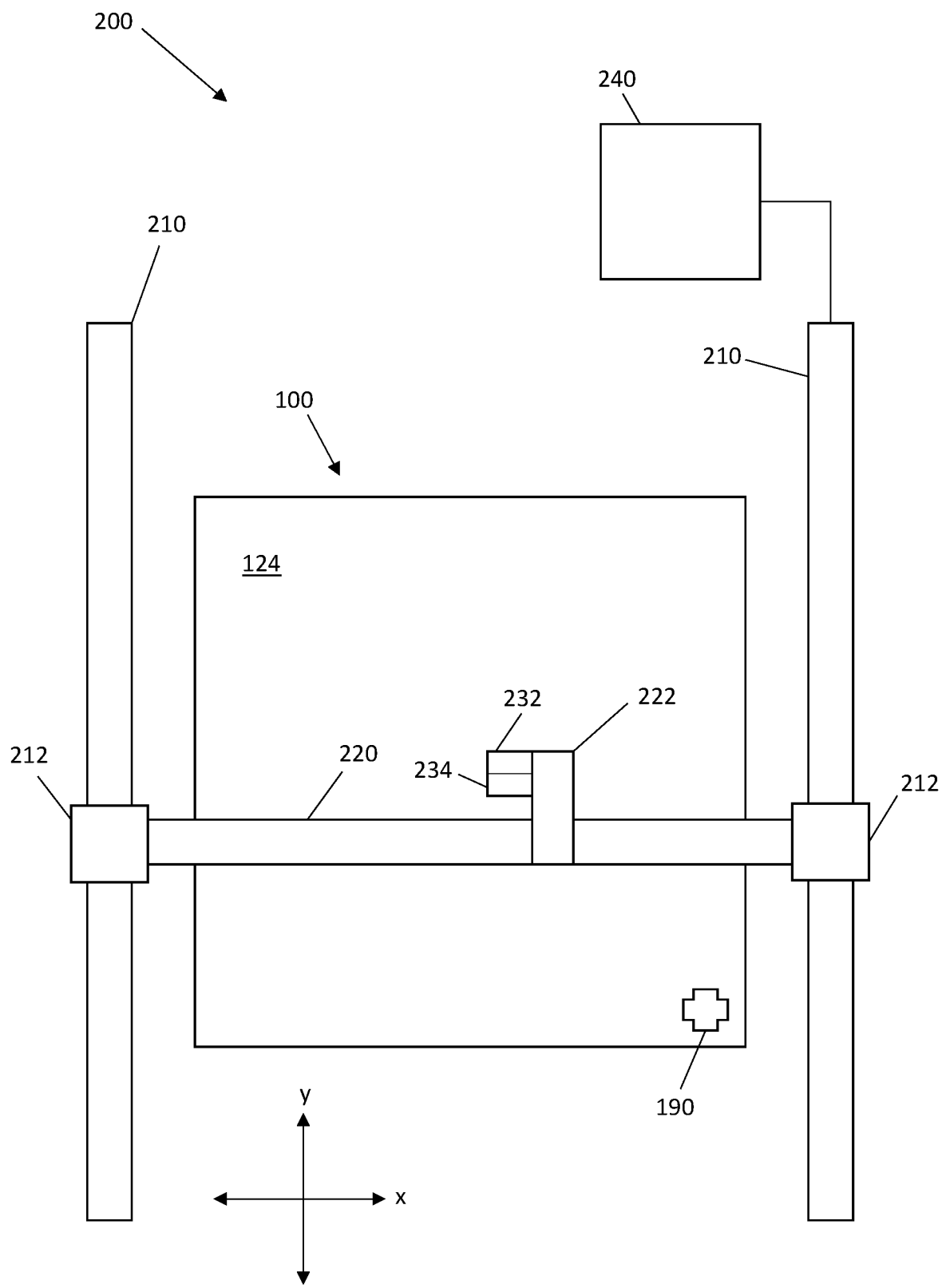
FIG. 11 is a schematic diagram of a system for identifying a bond boundary between a sound bond and weak bond in a multilayer article according to an exemplary embodiment.
Figure 12:
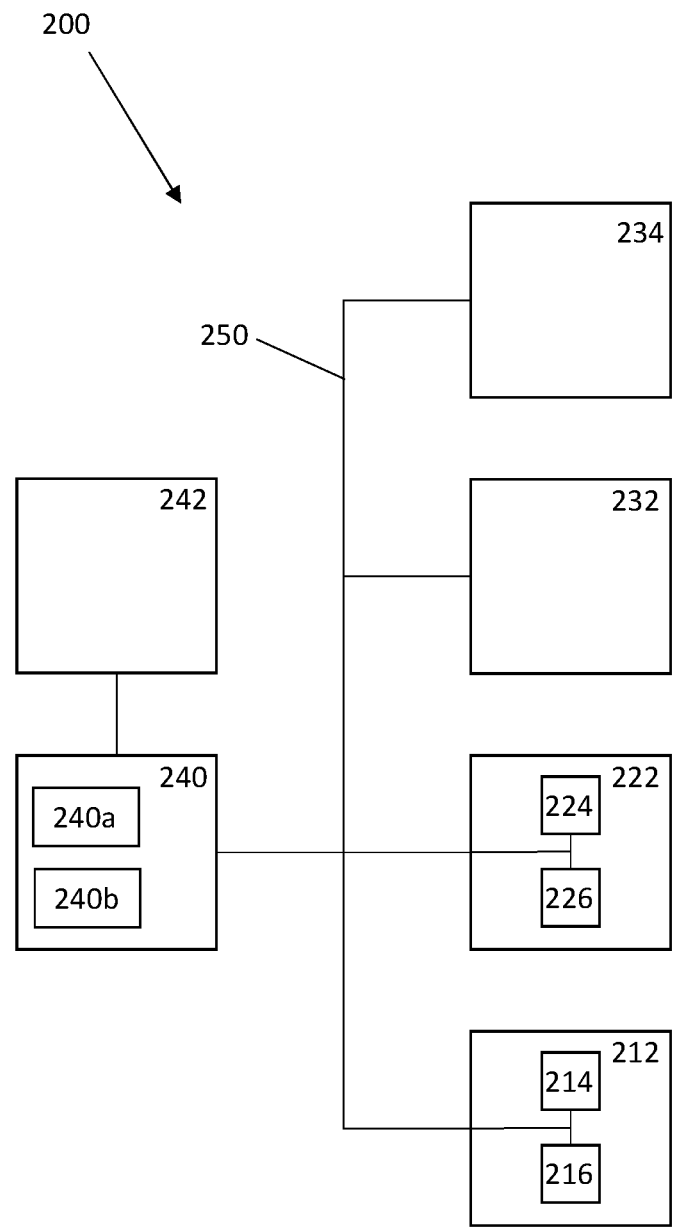
FIG. 12 is a schematic block diagram of a system for identifying a bond boundary between a sound bond and weak bond in a multilayer article according to an exemplary embodiment.

FIGS. 11-12 illustrate an exemplary embodiment of a system 200 for identifying a bond boundary between a sound bond and weak bond in an article 100 having a first layer and a second layer. As seen in FIG. 11, the system may include first rails 210, first rail mounts 212, a second rail 220, a tool head 222, an ultrasonic transducer 232, and a controller 240. In an exemplary embodiment, the system 200 may further include a marking device 234.

The second rail 220 may be mounted on the first rails 210 via the first rail mounts 212. The system may further include one or more first rail mount motors 214 (see FIG. 12) structured to move the first rail mounts 212 along the first rails 210 in a y-direction, thereby moving the second rail 220 in the y-direction due to the second rail 220 being mounted on the first rails 210 via the first rail mounts 212. The system 200 may further include one or more position sensors such as first rail mount encoders 216 (see FIG. 12) operably coupled to the first rail mount motor 214. The first rail mount encoder 216 may be configured to output an encoder signal indicative of a position in the y-direction of the first rail mounts 212 along the first rails 210.

The system 200 may further include a tool head motor 224 (see FIG. 12) structured to move the tool head 222 along the second rail 220 in an x-direction. The system 200 may further include a position sensor such as a tool head encoder 226 (see FIG. 12) operably coupled to the tool head motor 224. The tool head encoder 226 may be configured to output an encoder signal indicative of a position in the x-direction of the tool head 222 along the second rail 220.

In other words, the first rail mount motor 214 and the tool head motor 224 may be part of a motor system operably coupled to the tool head 222 and structured to move the tool head 222 along a two-dimensional plane parallel to a surface of the article 100. The first rail mount encoder 216 and the tool head encoder 226 are exemplary embodiments of encoders operably coupled to the motor system and configured to output encoder signals indicative of a position of the tool head 222.

The ultrasonic transducer 232 may be mounted on the tool head 222 in a fixed position relative to the tool head 222. Accordingly, a position of the ultrasonic transducer 232 may be calculated based on a position of the tool head 222 calculated from the encoder signals. Additionally, the marking device 234 may be mounted on the tool head 222 in a fixed position relative to the tool head 222. Accordingly, a position of the marking device 234 may be calculated based on a position of the tool head 222 calculated from the encoder signals. The marking device 234 may be any device suitable for marking a surface of the article being tested. Non-limiting examples of the marking device 234 may include a pen, a surface printer, a laser etcher, or another suitable marking tool to physically mark the boundary position on the article 100.

As seen in FIG. 12, the controller 240 may be operably coupled to the ultrasonic transducer 232, the first rail mount motor 214, the first rail mount encoder 216, the tool head motor 214, the tool head encoder 226, and the marking device 234 via a bus 250. Alternatively, the controller may be configured to communicate wirelessly with the ultrasonic transducer 232, the first rail mount motor 214, the first rail mount encoder 216, the tool head motor 214, the tool head encoder 226, and the marking device 234 via radio signals, Bluetooth, wireless LAN, or other suitable wireless communication methods.

As further seen in FIG. 12, the controller 240 may include a processor 240a and a memory 240b. The controller 240 may further be operably coupled to an external storage medium 242. Additionally, for the purposes of this disclosure, the controller 240 may also be considered to be operably coupled to the memory 240b. The memory 240b and the external storage medium 242 may be non-transitory computer-readable storage media. The processor 240a of the controller 240 may be configured to execute computer-executable instructions stored on either of the memory 240b and/or the external storage medium 242.

The memory 240b and the external storage medium 242 are examples of computer-readable media. Computer readable media can be any available media that can be accessed by a computer and includes both volatile and nonvolatile media, removable and non-removable media. By way of example, and not limitation, computer readable media may include computer storage media and communication media. Computer storage media may include both volatile and nonvolatile, removable and non-removable media implemented in any method or technology for storage of information such as computer readable instructions, data structures, program modules or other data. Computer storage media includes, but is not limited to, Random Access Memory (RAM), Read-Only Memory (ROM), Electrically Erasable Read-Only Memory (EEPROM), flash memory or other memory technology, Compact Disk Read-Only Optical Memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a computer. Communication media embodies one or more of computer readable instructions, data structures, program modules, and the like, and/or other data in a modulated data signal such as a carrier wave or other transport mechanism, and may include any known information delivery media consistent with this disclosure. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer readable media.

In an exemplary embodiment, the controller 240 may be configured to control the first rail mount motor 214 and the tool head motor 224 to move the transducer 232 to a plurality of positions 162 (see FIG. 7) along a surface of the article 100. While FIG. 11 shows that the transducer 232 is moved along the outer clad layer surface 124 of the article 100, it will also be understood that the transducer 232 may be moved along the base layer outer surface 114 of the article 100.

The controller 240 may be further configured to, for each position 162 of the plurality of positions 162, identify coordinates of the position based on the encoder signal from the first rail mount encoder 216 and the encoder signal from the tool head encoder 226 based on the fixed relationship between the transducer 232 and the tool head 222. In an exemplary embodiment, the coordinates may be calculated relative to a coordinate system native to the system 200. In another exemplary embodiment, the controller 240 may be configured to calculate the coordinates relative to an index mark 190 provided on the surface of the article 100.

The controller 240 may be further configured to control the transducer 232 to transmit ultrasonic waves through the article 100. The transducer 232 may be configured to receive reflected ultrasonic waves, such as waves reflected from the clad layer outer surface 124, waves reflected from an interface between the clad layer 120 and the base layer 110, and/or waves reflected from the base layer outer surface 114 (i.e., the backwall). The controller 240 may be further configured to generate a full-wave, time domain waveform based on reflected ultrasonic waves received by the transducer 232, such as the first waveform 700 shown in FIG. 8 or the second waveform 800 shown in FIG. 9. In an exemplary embodiment, the controller 240 may store the waveform in the memory 240b or the storage medium 242 as waveform data associated with the position on the surface of the article 100 where the waveform was recorded.

The controller 240 may be further configured to, for each pair of adjacent positions among the plurality of positions 162, determine whether there is a bond boundary between a first position of the pair and a second position of the pair. For example, FIG. 10 shows an exemplary embodiment of a pair of adjacent positions comprising the first position 170 and the second position 172, and the controller 240 may be configured to determine whether there is a bond boundary between the first position 170 and the second position 172. The controller 240 may do this by performing a comparison of a waveform characteristic of the first waveform 700 recorded at the first position 170 and the waveform characteristic of the second waveform 800 recorded at the second position 172. In an exemplary embodiment, the controller may determine whether there is a bond boundary between the first position 170 and the second position 172 by implementing any of the method 500 as described in FIG. 5, the method 600 as described in FIG. 6, or the method 900 as described in FIG. 30.

The controller 240 may be further configured to, in response to a determination that there is a bond boundary between the first position 170 and the second position 172, determine boundary coordinates based on one or both of the first position and the second position. For example, the controller 240 may be configured to set the coordinates of the boundary position to coordinates of the first position 170, coordinates of the second position 172, or coordinates calculated from both the first position 170 and the second position 172. For example, in the exemplary embodiment shown in FIG. 10, the coordinates of the boundary position 174 are calculated as a midpoint between the first position 170 and the second position 172.

Figure 13:
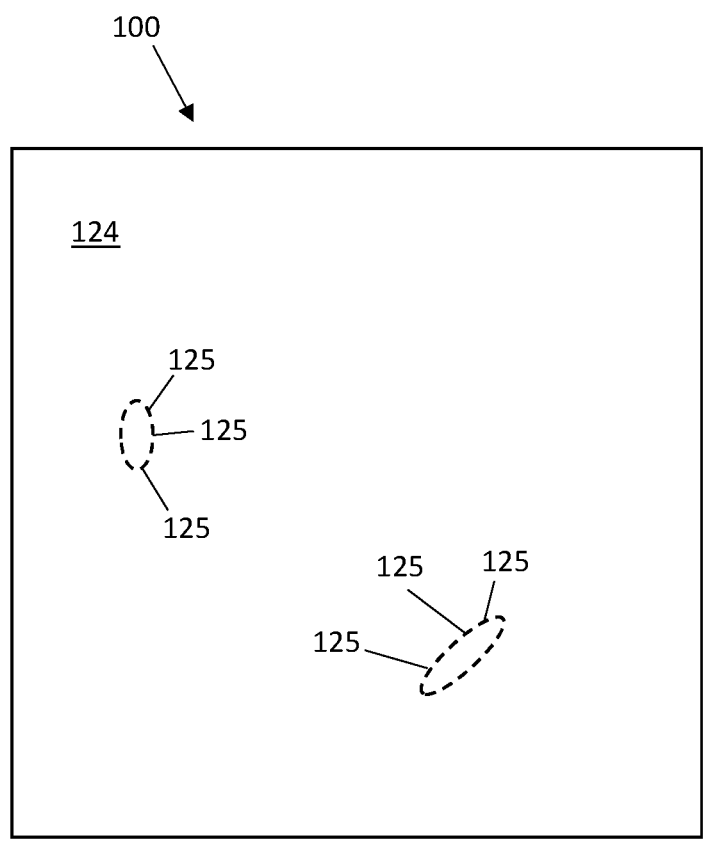
FIG. 13 is a schematic diagram of a surface of a multilayer article according to an exemplary embodiment.

In an exemplary embodiment, once the coordinates of the boundary position 174 are determined by the controller 240, a user may manually mark the coordinates of the boundary position 174 on the surface of the article 100 being tested. The area surrounding the coordinates of the boundary position 174 may be further tested in detail by hand to determine the full scope of the weak bond area in the article 100. Alternatively, in an exemplary embodiment, the controller 240 may be configured to memorialize the coordinates of the boundary position 174. For example, the controller 240 may be configured to control the marking tool 234 to mark a surface of the article 100 at a point corresponding to the boundary coordinates. Whether the markings are made manually by a user or automatically by the system 200 via the marking tool 234, once the testing is complete, the collective set of the markings 125 may indicate weak bond regions (see FIG. 13). In an exemplary embodiment, it may be presumed that the smaller regions set off by the markings 125 may be the weak bond regions, while the larger remaining regions correspond to a sound bond.

In an exemplary embodiment, either as an alternative to marking the article 100 or in addition to the marking, the controller 240 may be configured to memorialize the boundary coordinates by storing the boundary coordinates as electronic data in the memory 240b or the storage medium 242. The stored boundary coordinates may be used for later machining of the article, for example, a machine tool could be programmed to excise portions of the article 100 defined by the boundary coordinates, thereby excising the weak bond areas. Additionally, storing the boundary coordinates as electronic data may allow the boundary positions to be mapped onto an image of the article 100 on a computer display. In another exemplary embodiment, areas of the article 100 identified as having a weak bond may be repaired if possible.

While the system 200 is described above as employing the first rail encoder 216 and the tool head encoder 226, it will be understood that the system 200 is not limited to encoders for determining a position of the tool head 222. For example, other position detecting sensors such as photogrammetric sensors or laser sensors may be used. Alternatively, a retroreflector may be positioned on the tool head 222 for use with a laser metrology system.

Additionally, the system 200 is described above with reference to the tool head 222 being moved along the first rail 220 and the second rail 220. However, the system 200 is not limited to this embodiment. For example, in an alternative embodiment, the tool head 222 may be mounted on an articulated arm having multiple degrees of freedom in order to move the tool head to each of the required positions on the surface of the article 100.

FIGS. 14-29 are images showing portions of a cladded article identified as a sound bond and portions identified as a weak bond using one or more of the method 300, the method 400, the method 500, the method 600, and the method 900 described above. In FIGS. 14-29, the article 100 has a base layer 110 comprised of stainless steel and a clad layer 120 comprised of babbitt. The clad layer 120 was bonded to the base layer 110 through explosive welding.

Figure 14:
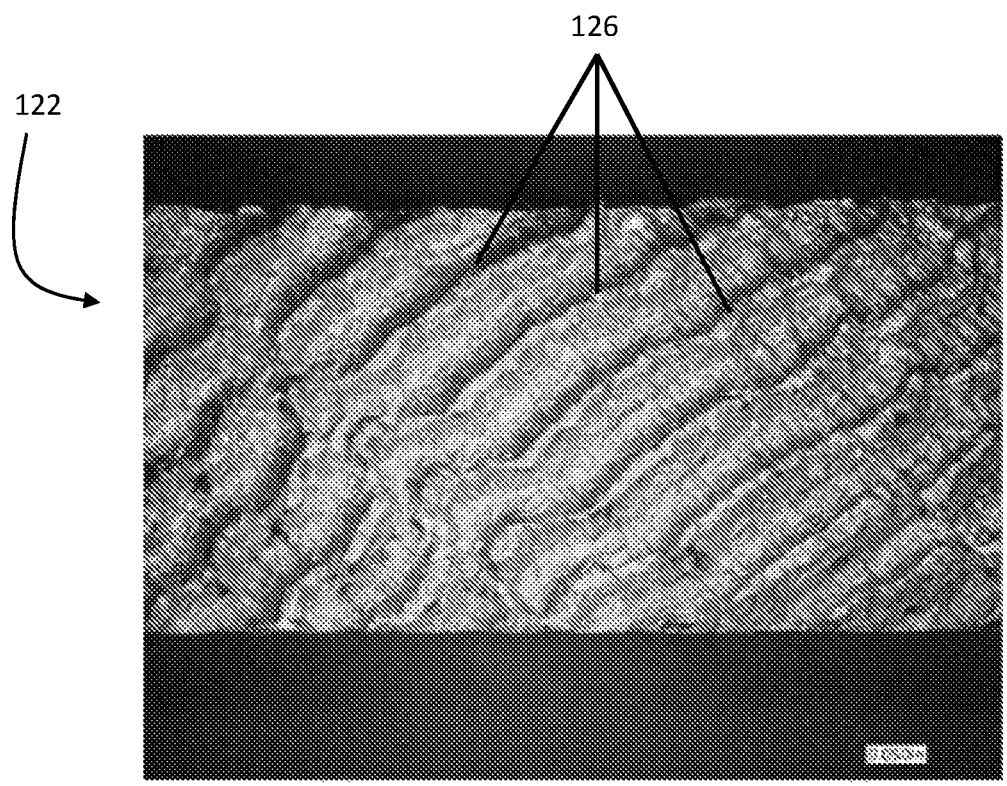
FIG. 14 is a low magnification light optical micrograph of a bonding surface of a clad layer of a cladded article according to an exemplary embodiment.
Figure 15:
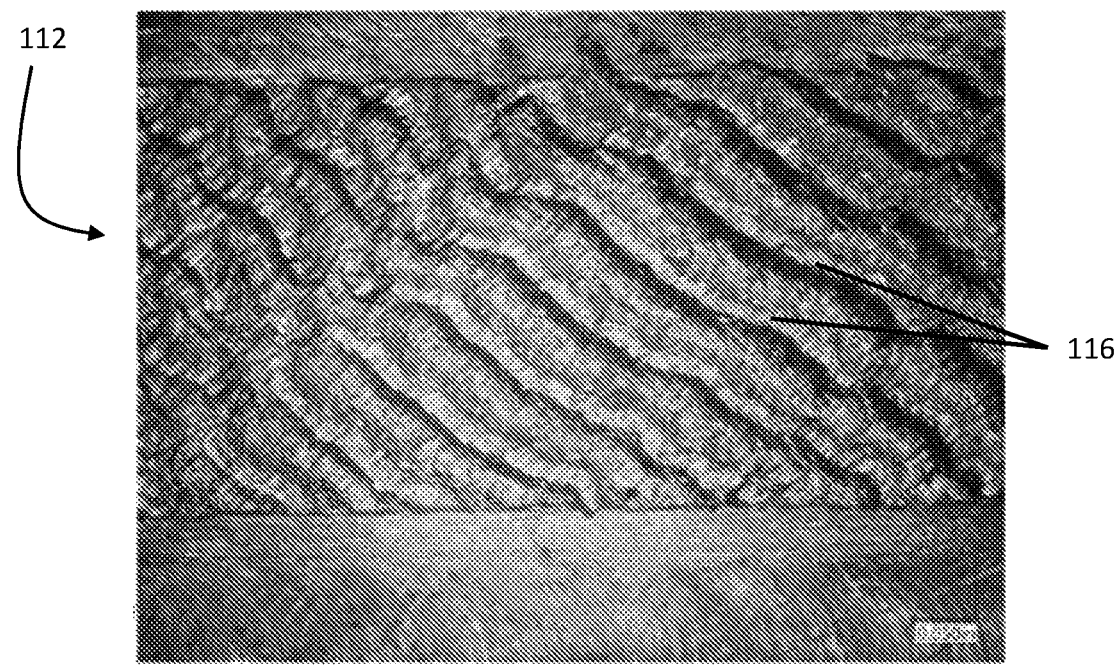
FIG. 15 is a low magnification light optical micrograph of a bonding surface of a base layer of a cladded article according to an exemplary embodiment.
Figure 16:
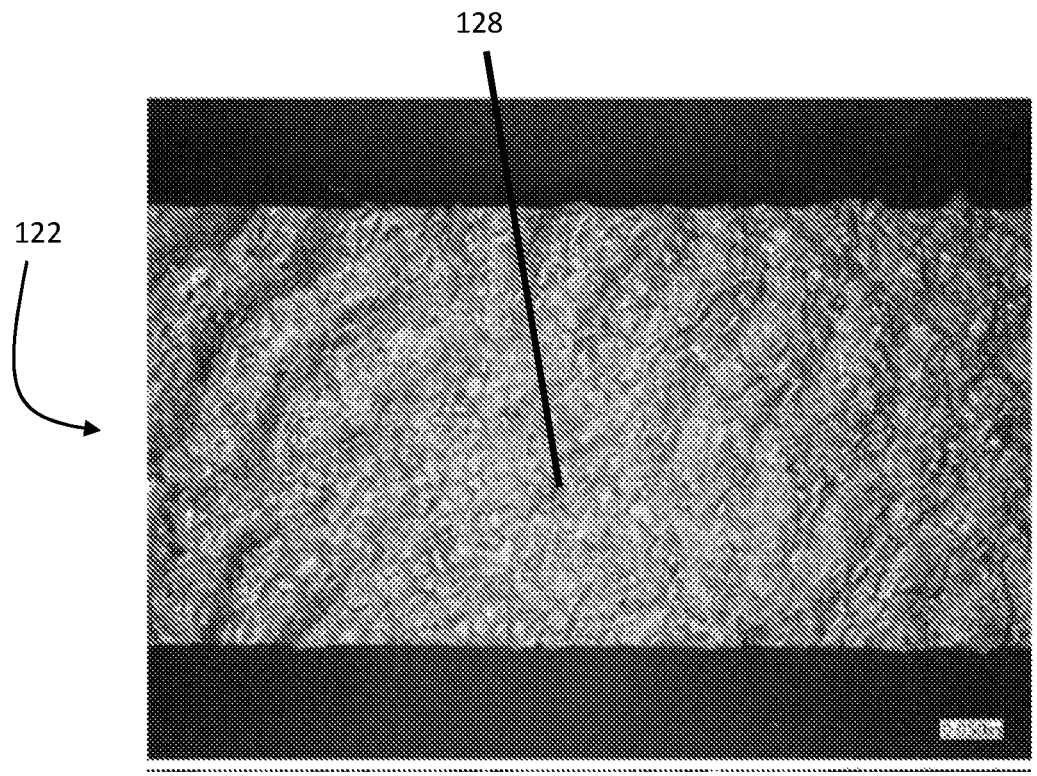
FIG. 16 is a low magnification light optical micrograph of a bonding surface of a clad layer of a cladded article according to an exemplary embodiment.
Figure 17:
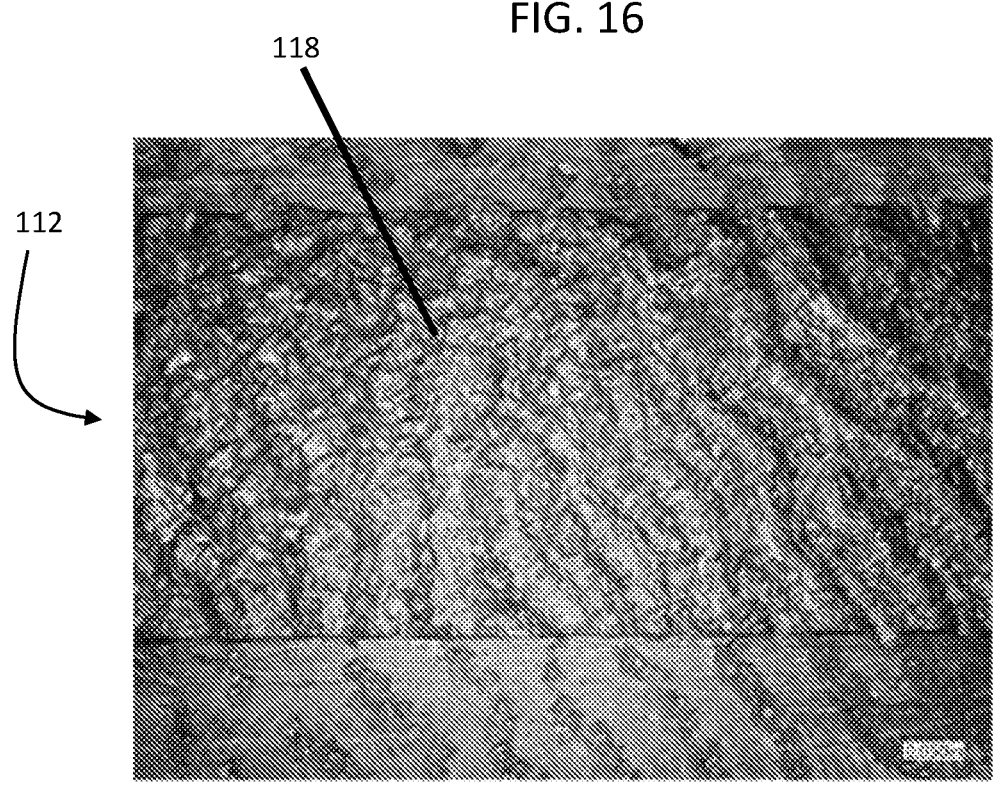
FIG. 17 is a low magnification light optical micrograph of a bonding surface of a base layer of a cladded article according to an exemplary embodiment.

FIGS. 14-17 are low magnification light optical micrographs of the base layer bonding surface 112 and the clad layer bonding surface 122. FIG. 14, corresponding to the clad layer bonding surface 122 in a sound bond area, shows coherent clad layer bond waves 126. Similarly, FIG. 15, corresponding to the base layer bonding surface 112 in a sound bond area, shows coherent base layer bond waves 116. In contrast, FIG. 16, corresponding to the clad layer bonding surface 122 in a weak bond area, shows incoherent clad layer bond waves 128, and FIG. 17, corresponding to the base layer bonding surface 112 in a weak bond area, shows incoherent base layer bond waves 118. The incoherent bond waves 118, 128 are indicative of a weak bond region.

Figure 18:
FIG. 18 is a high magnification light optical micrograph of a bonding surface of a clad layer of a cladded article according to an exemplary embodiment.
Figure 19:
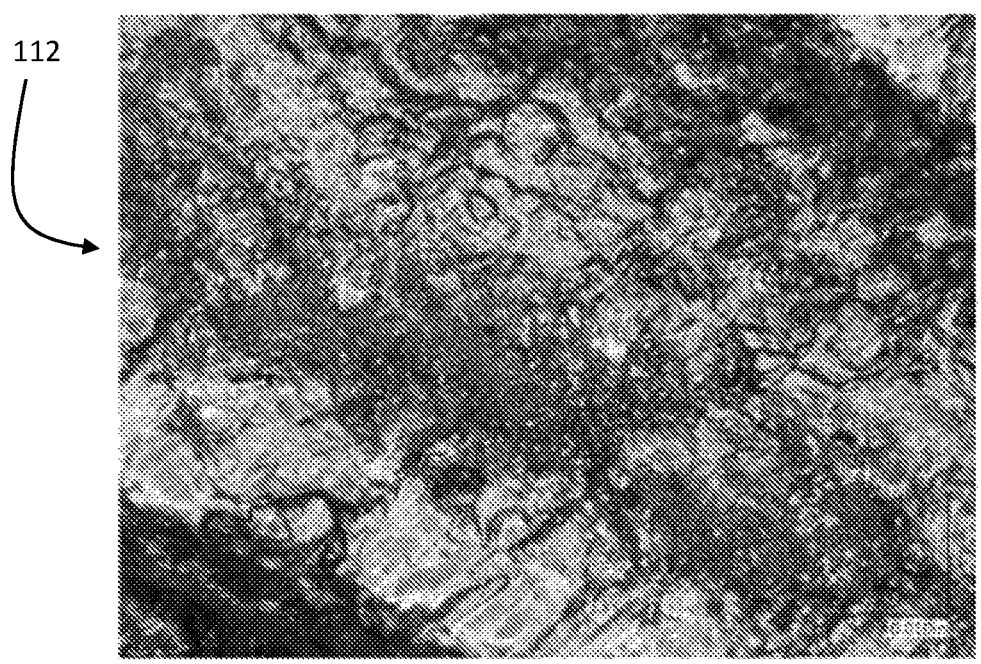
FIG. 19 is a high magnification light optical micrograph of a bonding surface of a base layer of a cladded article according to an exemplary embodiment.
Figure 20:
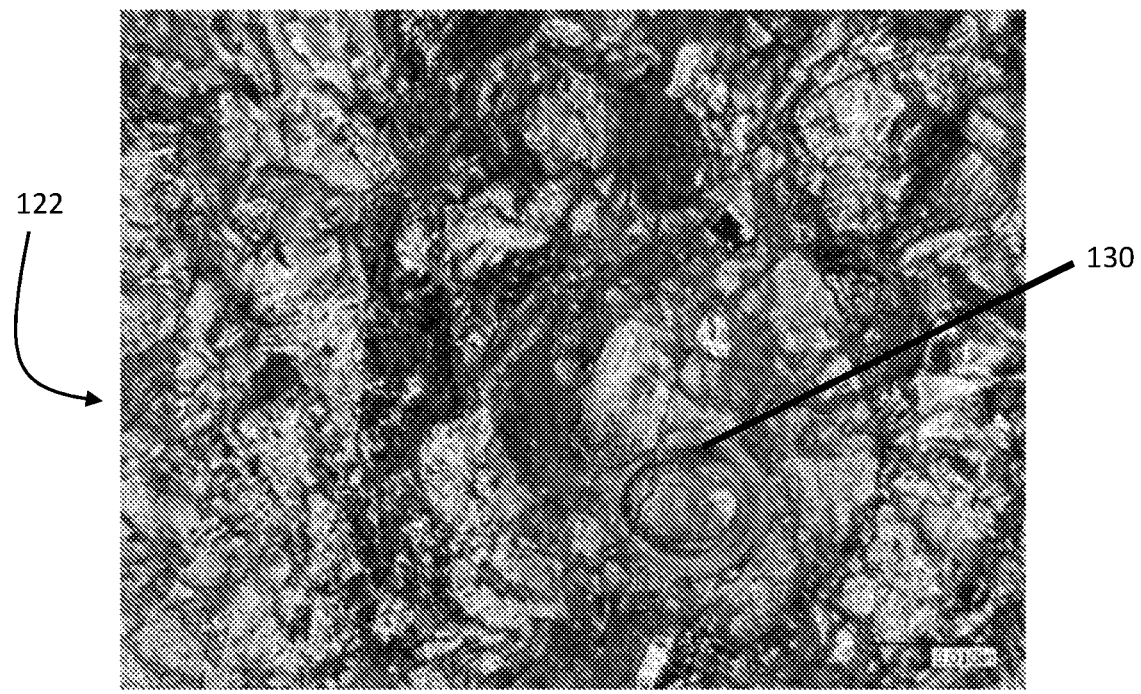
FIG. 20 is a high magnification light optical micrograph of a bonding surface of a clad layer of a cladded article according to an exemplary embodiment.
Figure 21:
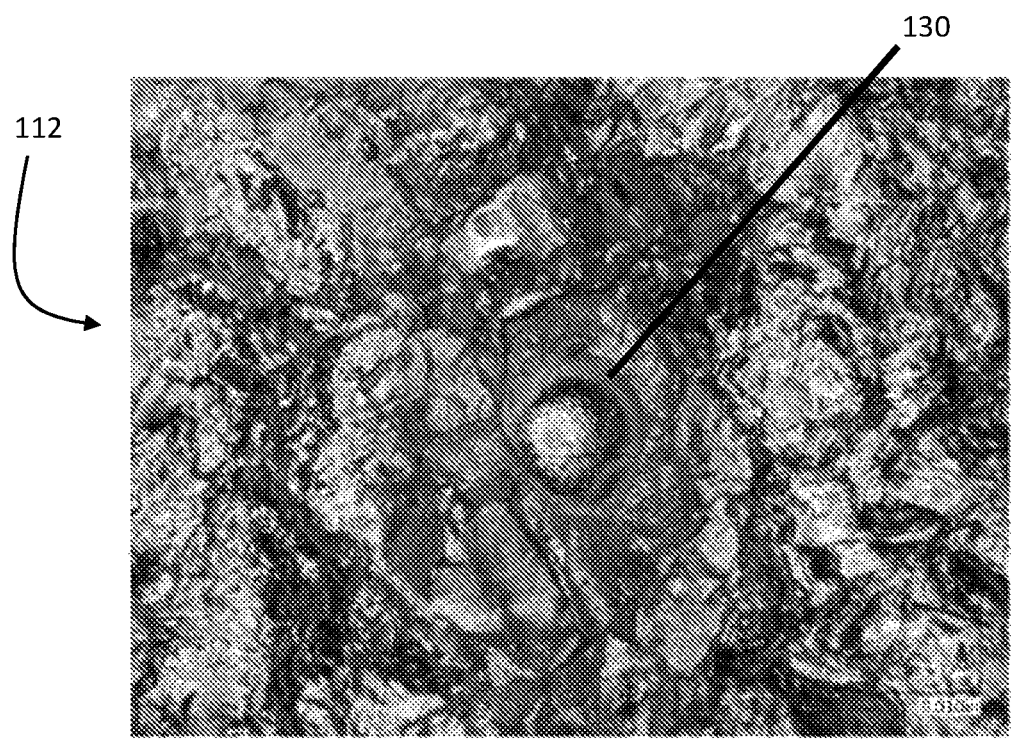
FIG. 21 is a high magnification light optical micrograph of a bonding surface of a base layer of a cladded article according to an exemplary embodiment.
Figure 24:
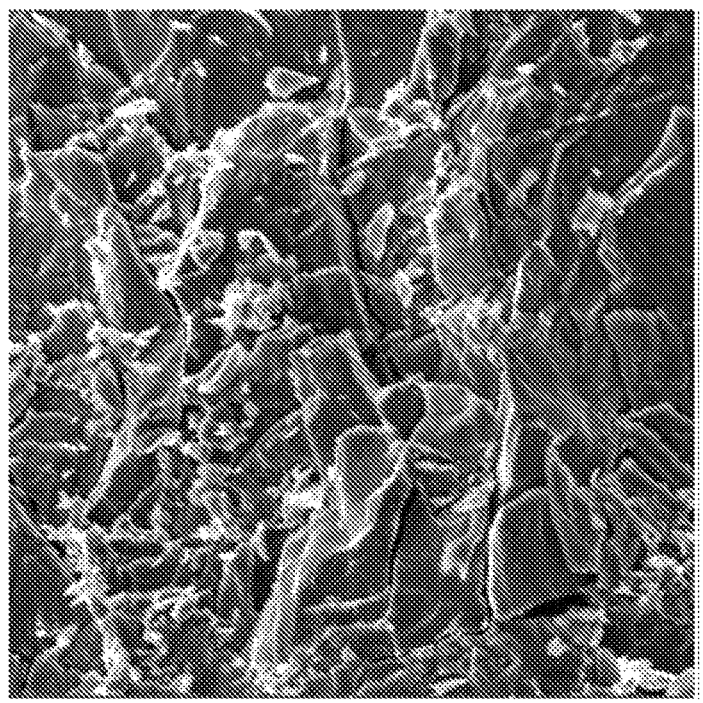
FIG. 24 is scanning electron microscope micrograph of a bonding surface of a clad layer of a cladded article according to an exemplary embodiment.
Figure 25:
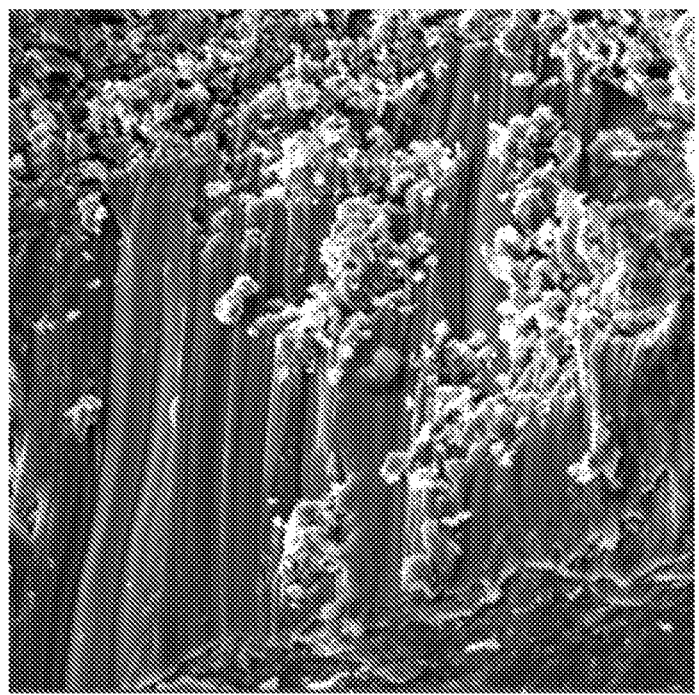
FIG. 25 is scanning electron microscope micrograph of a bonding surface of a clad layer of a cladded article according to an exemplary embodiment.
Figure 26:
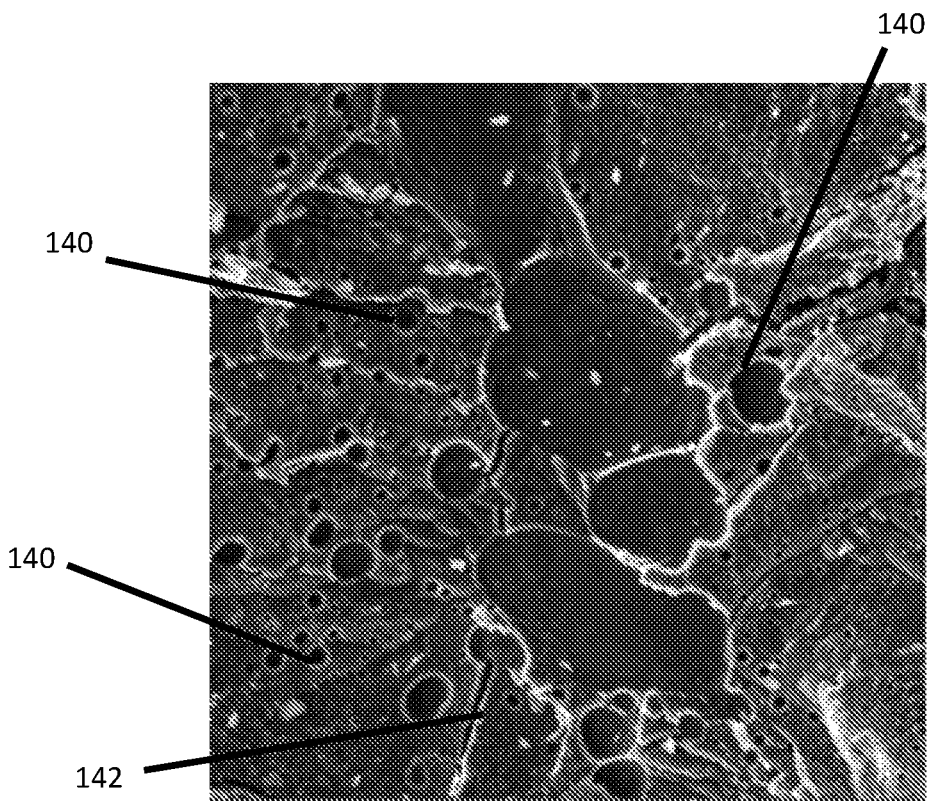
FIG. 26 is scanning electron microscope micrograph of a bonding surface of a clad layer of a cladded article according to an exemplary embodiment.
Figure 27:
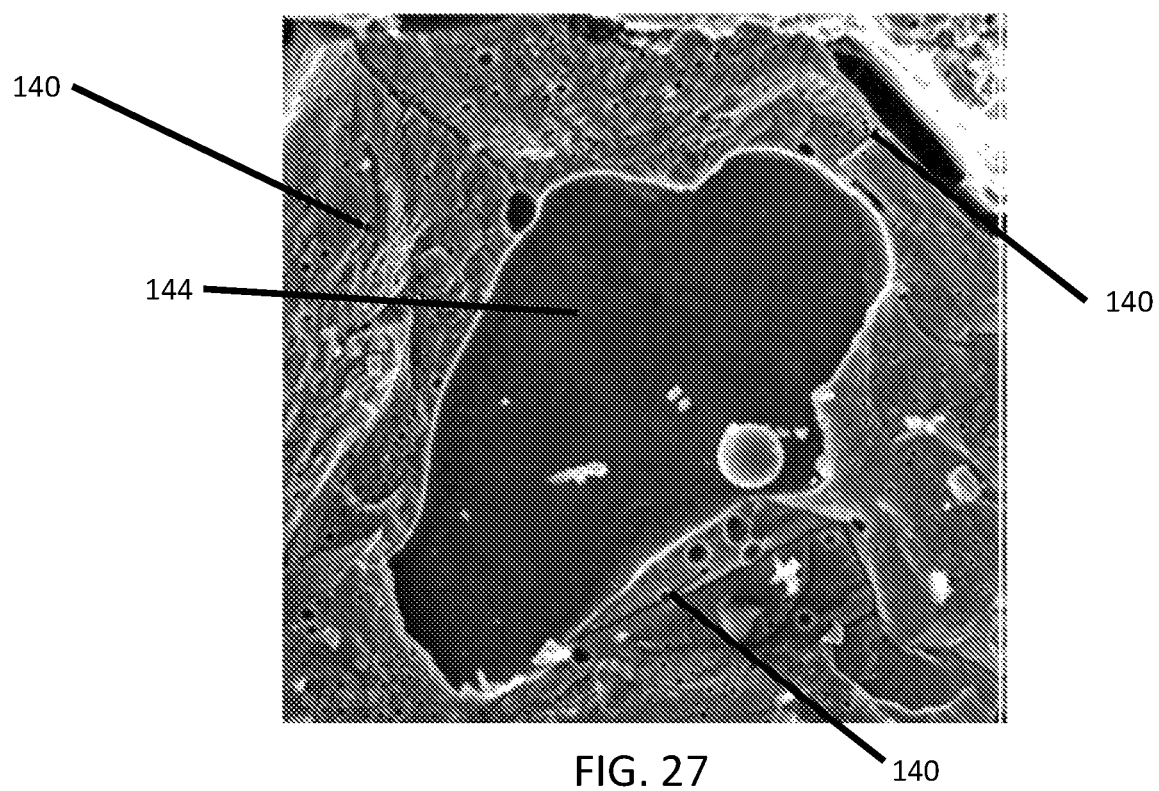
FIG. 27 is scanning electron microscope micrograph of a bonding surface of a clad layer of a cladded article according to an exemplary embodiment.
Figure 28:
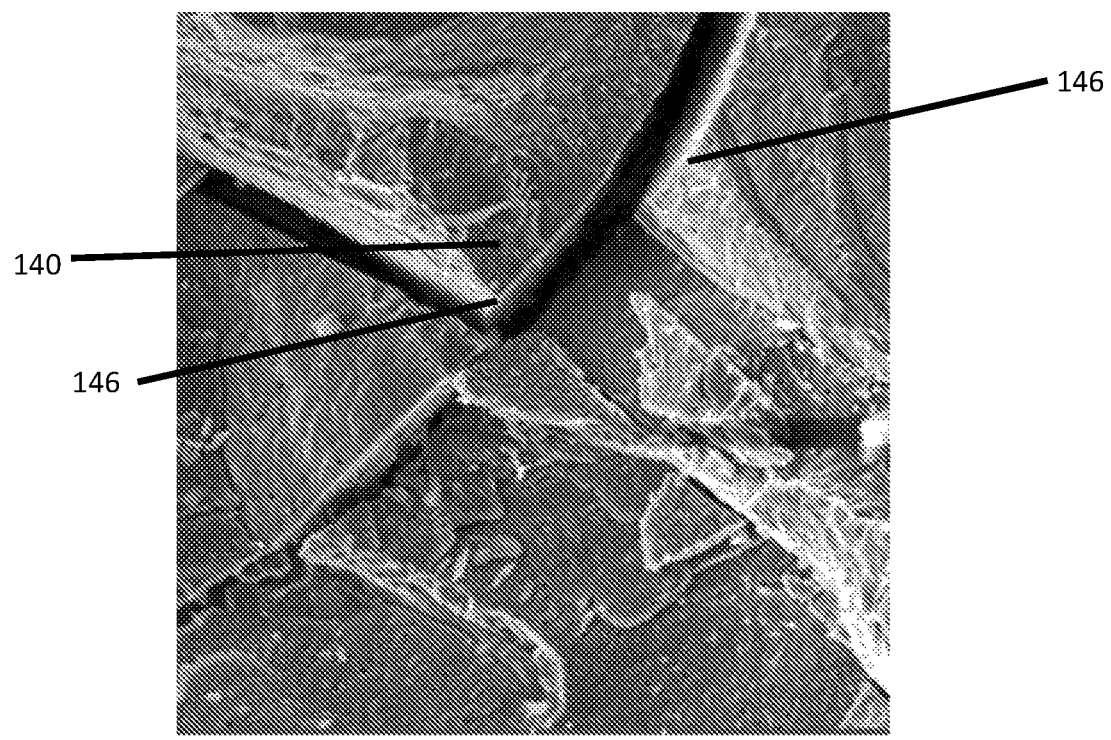
FIG. 28 is scanning electron microscope micrograph of a bonding surface of a clad layer of a cladded article according to an exemplary embodiment.
Figure 29:
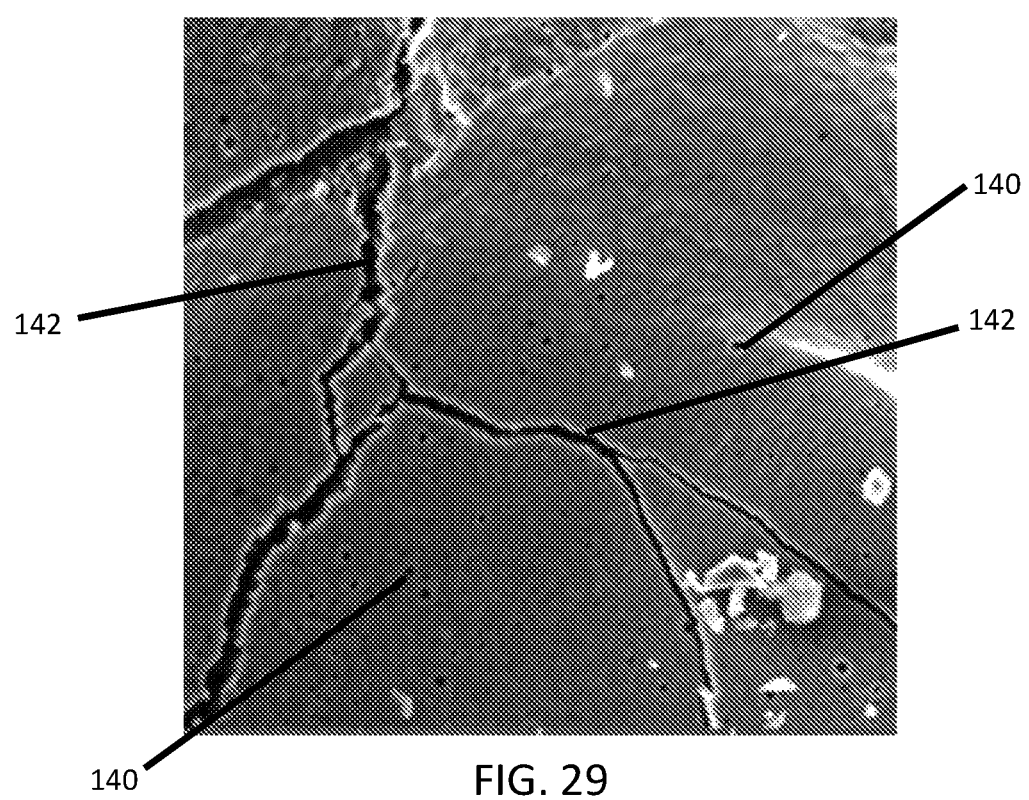
FIG. 29 is scanning electron microscope micrograph of a bonding surface of a clad layer of a cladded article according to an exemplary embodiment.

FIGS. 18-21 are high magnification light optical micrographs of the base layer bonding surface 112 and the clad layer bonding surface 122. In FIG. 18, corresponding to the clad layer bonding surface 122 in a sound bond area, and FIG. 19, corresponding to the base layer bonding surface 112 in a sound bond area, there are no visible defects. In contrast, FIG. 20, corresponding to the clad layer bonding surface 122 in a weak bond area, and FIG. 21, corresponding to the base layer bonding surface 112 in a weak bond area, show circular defects 130 indicative of a weak bond area.

FIGS. 22-25 are scanning electron microscope (SEM) micrographs of areas of the clad layer bond surface 122 in a sound bond area. The smeared appearance of the surface and limited microcracking in FIGS. 22-25 are indicative of a sound bond. In contrast, FIGS. 26-29 are SEM micrographs of areas of the clad layer bond surface 112 in a weak bond area. It will be seen in FIGS. 26-29 that there is significant microporosity indicated by voids 140, significant cracking 142, rounded and/or elliptical structures 144, and severe angular features 146, all of which are indicative of a weak bond area.

Accordingly, in view of FIGS. 14-29, the methods described herein were successful in non-destructively identifying a weak bond area from a sound bond area, which was subsequently confirmed through detailed inspection of the bonding surfaces.

This disclosure, in various embodiments, configurations and aspects, includes components, methods, processes, systems, and/or apparatuses as depicted and described herein, including various embodiments, sub-combinations, and subsets thereof. This disclosure contemplates, in various embodiments, configurations and aspects, the actual or optional use or inclusion of, e.g., components or processes as may be well-known or understood in the art and consistent with this disclosure though not depicted and/or described herein.

Embodiments of the disclosure are operational with numerous other general purpose or special purpose computing system environments or configurations. Examples of computing systems, environments, and/or configurations that may be suitable for use with the systems and methods described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The embodiments of the disclosure may be described in the general context of computer-executable instructions, such as program modules, being executed by a computer. Generally, program modules may include routines, programs, objects, components, data structures, etc. that perform particular tasks or implement particular abstract data types. The systems and methods described herein may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the exemplary embodiments as processor executable instructions, which can be written on any form of a computer readable media in a corresponding computing environment according to this disclosure.

The phrases "at least one," "one or more," and "and/or" are open-ended expressions that are both conjunctive and disjunctive in operation. For example, each of the expressions "at least one of A, B and C;" "at least one of A, B, or C;" "one or more of A, B, and C;" "one or more of A, B, or C;" and "A, B, and/or C" means A alone; B alone; C alone; A and B together; A and C together; B and C together; or A, B, and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment," "some embodiments," "an embodiment," and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that the appended claims should cover variations in the ranges except where this disclosure makes clear the use of a particular range in certain embodiments.

The terms "determine," "calculate," "compute," and variations thereof, as used herein, are used interchangeably and include any type of methodology, process, mathematical operation or technique.

This disclosure is presented for purposes of illustration and description. This disclosure is not limited to the form or forms disclosed herein. In the Detailed Description of this disclosure, for example, various features of some exemplary embodiments are grouped together to representatively describe those and other contemplated embodiments, configurations, and aspects, to the extent that including in this disclosure a description of every potential embodiment, variant, and combination of features is not feasible. Thus, the features of the disclosed embodiments, configurations, and aspects may be combined in alternate embodiments, configurations, and aspects not expressly discussed above. For example, the features recited in the following claims lie in less than all features of a single disclosed embodiment, configuration, or aspect. Thus, the following claims are hereby incorporated into this Detailed Description, with each claim standing on its own as a separate embodiment of this disclosure.

Advances in science and technology may provide variations that are not necessarily express in the terminology of this disclosure although the claims would not necessarily exclude these variations.

What is claimed is:

1. A method of identifying a bond boundary between a sound bond and weak bond in an article having a first layer and a second layer, the method comprising:
   determining a plurality of positions on a surface of the article;
   for each position of the plurality of positions, obtaining a full-wave, time domain waveform of ultrasonic waves reflected from the article;
   for each pair of adjacent positions among the plurality of positions:
   determining whether there is a bond boundary between a first position of the pair of adjacent positions and a second position of the pair of adjacent positions based on a comparison of a waveform characteristic of a first waveform generated at the first position and the waveform characteristic of a second waveform generated at the second position; and
   in response to a determination that there is a bond boundary between the first position and the second position, determining a boundary position based on one or both of the first position and the second position and memorializing the boundary position;
   wherein the determining whether there is a bond boundary between the first position and the second position comprises:
      counting a first peak number of peaks of the first waveform;
      counting a first trough number of troughs of the first waveform;
      counting a second peak number of peaks of the second waveform;
      counting a second trough number of troughs of the second waveform;
      determining, in response to the first peak number being equal to the second peak number and the first trough number being equal to the second trough number, that there is not a bond boundary between the first position and the second position; and
      determining, in response to the first peak number being unequal to the second peak number or the first trough number being unequal to the second trough number, that there is a bond boundary between the first position and the second position.

2. The method of claim 1, wherein the obtaining a full-wave, time domain waveform comprises:
   transmitting ultrasonic waves through the article via a transducer;
   receiving reflected ultrasonic waves with the transducer; and
   generating the full-wave, time domain waveform based on the reflected ultrasonic waves.

3. The method of claim 1, wherein the obtaining a full-wave, time domain waveform comprises:
   acquiring waveform data corresponding to the full-wave, time domain waveform from a storage medium.

4. The method of claim 1, wherein:
   the waveform characteristic is evaluated for a predetermined x-axis range for the first waveform and the second waveform; and the predetermined x-axis range is based on a speed of sound waves through a material of the first layer and a thickness of the first layer.

5. The method of claim 1, wherein the memorializing the boundary position comprises marking a surface of the article at a position corresponding to the boundary position.

6. The method of claim 1, wherein the memorializing the boundary position comprises storing coordinates of the boundary position in a storage medium.

7. The method of claim 1, wherein:
the article is a cladded article;
the first layer comprises a first metal or a first metal alloy; and
the second layer comprises a second metal or a second metal alloy.

8. The method of claim 7, wherein the first layer is solid-state welded to the second layer.

9. The method of claim 8, wherein the first layer is explosively welded to the second layer.

10. A system for identifying a bond boundary between a sound bond and weak bond in an article having a first layer and a second layer, the system comprising:
a tool head;
an ultrasonic transducer mounted on the tool head in a fixed position relative to the tool head;
a motor system operably coupled to the tool head and structured to move the tool head along a two-dimensional plane parallel to a surface of the article;
a position sensor configured to output a position signal indicative of a position of the tool head;
a controller operably coupled to the ultrasonic transducer, the motor system, and the position sensor, wherein the controller is configured to perform:
controlling the motor system to move the transducer to a plurality of positions along a surface of the article;
for each position of the plurality of positions:
identifying coordinates of the position based on the position signal;
controlling the transducer to transmit ultrasonic waves through the article; and
generating a full-wave, time domain waveform based on reflected ultrasonic waves received by the transducer;
for each pair of adjacent positions among the plurality of positions:
determining whether there is a bond boundary between a first position of the pair of adjacent positions and a second position of the pair of adjacent positions based on a comparison of a waveform characteristic of the first waveform generated at the first position and the waveform characteristic of the second waveform generated at the second position; and
in response to a determination that there is a bond boundary, determining boundary coordinates based on one or both of the first position and the second position;
wherein the controller is configured such that the determining whether there is a bond boundary between the first position and the second position comprises:
counting a first peak number of peaks of the first waveform;
counting a first trough number of troughs of the first waveform;
counting a second peak number of peaks of the second waveform;
counting a second trough number of troughs of the second waveform;
determining, in response to the first peak number being equal to the second peak number and the first trough number being equal to the second trough number, that there is not a bond boundary between the first position and the second position; and
determining, in response to the first peak number being unequal to the second peak number or the first trough number being unequal to the second trough number, that there is a bond boundary between the first position and the second position.

11. The system of claim 10, further comprising a storage medium operably coupled to the controller;
wherein the controller is configured to, in response to the determination that there is a bond boundary, memorialize the boundary coordinates by storing the boundary coordinates in the storage medium.

12. The system of claim 10, further comprising a marking tool mounted on the tool head and operably coupled to the controller;
wherein the controller is configured to, in response to the determination that there is a bond boundary, memorialize the boundary coordinates by controlling the marking tool to mark the surface of the article at the boundary coordinates.

13. The system of claim 10, wherein:
the controller is configured such that the waveform characteristic is evaluated for a predetermined x-axis range for the first waveform and the second waveform; and
the predetermined x-axis range is based on a speed of sound waves through a material of the first layer and a thickness of the first layer.

14. A method of identifying a bond boundary between a sound bond and weak bond in an article having a first layer and a second layer, the method comprising:
determining a plurality of positions on a surface of the article;
for each position of the plurality of positions, obtaining a full-wave, time domain waveform of ultrasonic waves reflected from the article;
for each pair of adjacent positions among the plurality of positions:
determining whether there is a bond boundary between a first position of the pair of adjacent positions and a second position of the pair of adjacent positions based on a comparison of a waveform characteristic of a first waveform generated at the first position and the waveform characteristic of a second waveform generated at the second position; and
in response to a determination that there is a bond boundary between the first position and the second position, determining a boundary position based on one or both of the first position and the second position and memorializing the boundary position;
wherein the determining whether there is a bond boundary between the first position and the second position comprises:
counting a first peak number of peaks of the first waveform;
counting a first trough number of troughs of the first waveform;
counting a second peak number of peaks of the second waveform;
counting a second trough number of troughs of the second waveform;

determining, in response to a first sum of the first peak number and the first trough number being equal to a second sum of the second peak number and the second trough number, that there is not a bond boundary between the first position and the second position; and determining, in response to the first sum being non-equal to the second sum, that there is a bond boundary between the first position and the second position.

15. A system for identifying a bond boundary between a sound bond and weak bond in an article having a first layer and a second layer, the system comprising:

a tool head;

an ultrasonic transducer mounted on the tool head in a fixed position relative to the tool head;

a motor system operably coupled to the tool head and structured to move the tool head along a two-dimensional plane parallel to a surface of the article;

a position sensor configured to output a position signal indicative of a position of the tool head;

a controller operably coupled to the ultrasonic transducer, the motor system, and the position sensor, wherein the controller is configured to perform:

controlling the motor system to move the transducer to a plurality of positions along a surface of the article;

for each position of the plurality of positions:
identifying coordinates of the position based on the position signal;
controlling the transducer to transmit ultrasonic waves through the article; and
generating a full-wave, time domain waveform based on reflected ultrasonic waves received by the transducer;

for each pair of adjacent positions among the plurality of positions:
determining whether there is a bond boundary between a first position of the pair of adjacent positions and a second position of the pair of adjacent positions based on a comparison of a waveform characteristic of the first waveform generated at the first position and the waveform characteristic of the second waveform generated at the second position; and
response to a determination that there is a bond boundary, determining boundary coordinates based on one or both of the first position and the second position;

wherein the wherein the controller is configured such that the determining whether there is a bond boundary between the first position and the second position comprises:

counting a first peak number of peaks of the first waveform;

counting a first trough number of troughs of the first waveform;

counting a second peak number of peaks of the second waveform;

counting a second trough number of troughs of the second waveform;

determining, in response to a first sum of the first peak number and the first trough number being equal to a second sum of the second peak number and the second trough number, that there is not a bond boundary between the first position and the second position; and determining, in response to the first sum being non-equal to the second sum, that there is a bond boundary between the first position and the second position.

* * * * *

UNITED STATES PATENT AND TRADEMARK OFFICE
CERTIFICATE OF CORRECTION

| | |
|---|---|
| PATENT NO. | : 12,111,290 B2 |
| APPLICATION NO. | : 17/604241 |
| DATED | : October 8, 2024 |
| INVENTOR(S) | : Brian Payton et al. |

It is certified that error appears in the above-identified patent and that said Letters Patent is hereby corrected as shown below:

In the Claims

At Column 22, Claim 15, Line number 15, please delete the words "wherein the" that appear after the words "wherein the".

Signed and Sealed this
Twelfth Day of November, 2024

Katherine Kelly Vidal
*Director of the United States Patent and Trademark Office*